US008414388B2

(12) United States Patent
Goto et al.

(10) Patent No.: US 8,414,388 B2
(45) Date of Patent: Apr. 9, 2013

(54) GAME SYSTEM AND NOTIFICATION PROCESSING APPARATUS CONSTITUTING THE SAME

(75) Inventors: Nobuhiro Goto, Kanagawa (JP); Kazuhiro Kusuda, Kanagawa (JP); Takashi Uchiyama, Kanagawa (JP); Masato Okuaki, Kanagawa (JP); Hiroto Nakamoto, Kanagawa (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

(21) Appl. No.: 12/681,140

(22) PCT Filed: Oct. 2, 2008

(86) PCT No.: PCT/JP2008/067924

§ 371 (c)(1), (2), (4) Date: Apr. 1, 2010

(87) PCT Pub. No.: WO2009/044804

PCT Pub. Date: Apr. 9, 2009

(65) Prior Publication Data

US 2010/0222137 A1 Sep. 2, 2010

(30) Foreign Application Priority Data

Oct. 5, 2007 (JP) ................................ 2007-262762

(51) Int. Cl.
*A63F 13/12* (2006.01)

(52) U.S. Cl. ................. 463/26; 463/27; 463/40; 463/42

(58) Field of Classification Search .............. 463/16–20, 463/26, 27, 40–42

See application file for complete search history.

(56) References Cited

U.S. PATENT DOCUMENTS

| | | | | |
|---|---|---|---|---|
| 2005/0054430 | A1 * | 3/2005 | Pitman et al. | 463/25 |
| 2005/0054447 | A1 | 3/2005 | Hiroyama et al. | |
| 2006/0040736 | A1 | 2/2006 | Baerlocher et al. | |

(Continued)

FOREIGN PATENT DOCUMENTS

| | | | |
|---|---|---|---|
| JP | 11-169544 | A | 6/1999 |
| JP | 2002-253842 | A | 9/2002 |

(Continued)

OTHER PUBLICATIONS

Chinese Office Action for related Chinese Application No. 200880108147.5 dated Feb. 24, 2012, pp. 1-16.

(Continued)

*Primary Examiner* — Damon Pierce

(57) ABSTRACT

A game system includes: a jackpot drawing apparatus for performing a payout process for paying out to a winning player at least part of an amount indicated by payout amount data when the drawing unit determines winning of the jackpot award; and a notification processing apparatus for performing, when performing the jackpot award winning notification process for notifying the player who has won the jackpot award, of winning of the jackpot award, prior to issuing the same, an advance notification process for issuing an advance notification to the effect that a player who plays by using each game apparatus belonging to a predetermined group configured by two or more game apparatuses including the game apparatus with which the player who wins the jackpot award plays is notified that the player who plays by using either game apparatus belonging to the predetermined group wins the jackpot award.

11 Claims, 17 Drawing Sheets

U.S. PATENT DOCUMENTS

| | | | | |
|---|---|---|---|---|
| 2006/0052159 | A1* | 3/2006 | Cahill et al. | 463/27 |
| 2010/0222136 | A1 | 9/2010 | Goto et al. | |
| 2010/0240456 | A1 | 9/2010 | Goto et al. | |

FOREIGN PATENT DOCUMENTS

| | | | |
|---|---|---|---|
| JP | 2004-290387 | A | 10/2004 |
| JP | 2004-298414 | A | 10/2004 |
| JP | 2007-215739 | A | 8/2007 |

OTHER PUBLICATIONS

Taiwanese Patent Office, First Office Action, Jul. 25, 2012.

Taiwanese Patent Office, Search Report, Jul. 25, 2012.

International Search Report of PCT/JP2008/067924, Nov. 18, 2008.

Japanese Office Action for corresponding JP Application No. 2007-262762, Nov. 14, 2008.

Written Opinion of the International Searching Authority for PCT/JP2008/067924, Nov. 18, 2008.

Patent Office of the People's Republic of China, Chinese Office Action for corresponding Chinese application No. 200880108147.5, Nov. 14, 2012, p. 1-6.

* cited by examiner

FIG. 16
WIDE AREA
PROGRESSIVE
JACKPOT CHANCE

FIG. 17
GRAND
115735
MIDDLE
27650
MINI
or
×3
500
ANY
100
A
B
A

GAME SYSTEM AND NOTIFICATION PROCESSING APPARATUS CONSTITUTING THE SAME

TECHNICAL FIELD

The present invention relates to a game system including a plurality of game apparatuses, a jackpot drawing apparatus, and a notification processing apparatus for issuing a winning notification of a jackpot award, and a notification processing apparatus constituting the same.

BACKGROUND ART

Conventionally, as this type of a jackpot drawing apparatus, there is known that which is utilized for a game system configured by a plurality of token-operated game machines (game apparatuses) installed in a gaming arcade, etc. (e.g., Patent Document 1). Generally, the token-operated game machine is configured to control game progress under a condition of receiving a token (betting target) from a player, and according to a game result, to pay out to the player a predetermined number of tokens (payout target). One example of a token-operated game machine utilizing the jackpot drawing apparatus will be now explained: a number of tokens equivalent to a part of the number of tokens (betting target) received from the player is cumulatively added, and this number is held, as payout amount data, in a storage unit of the jackpot drawing apparatus. Then, when a predetermined drawing start condition is satisfied, a drawing is carried out in the jackpot drawing apparatus so as to determine whether the jackpot award is won or it is lost (the jackpot award is not won). When the jackpot award is won in this drawing, a number of tokens equivalent to at least a part of the amount of the payout amount data is paid out to the player who satisfies the predetermined drawing start condition, and at the same time, the payout amount data is restored to an initial value.

Generally, the jackpot drawing apparatus is often utilized in a game system configured by a plurality of game apparatuses, each including a game progress control unit for independently advancing a game. The reason for this is provided below: That is, the number of tokens that each game apparatus can pay out to the player once is limited to a certain degree because of a factor arising from a payout ratio previously set to each game apparatus. Therefore, when the jackpot drawing apparatus is utilized for a single game apparatus, a limit imposed on the number of tokens to be paid out that is determined when that jackpot award is won is greatly limited by a payout ratio set to that game apparatus. On the contrary, when the jackpot drawing apparatus is utilized for a game system configured by a plurality of game apparatuses, the limit imposed on the number of tokens to be paid out that is determined when that jackpot award is won can be determined by using a factor arising from payout ratios set to the plurality of game apparatuses. In this case, as compared to a case where the jackpot drawing apparatus is utilized for a single game apparatus, it is possible to increase the number of tokens to be paid out that is determined when the jackpot award is won. As a result, it becomes possible to give a player an expectation that winning of the jackpot award ensures a payout of a large amount of tokens at once, making it possible to attract the player's interest. Because of these benefits, the jackpot drawing apparatus is not utilized for a single game apparatus but is often utilized for the game system configured by a plurality of game apparatuses.

[Patent Document 1] Japanese Published Unexamined Patent Application No. 2002-253842

DISCLOSURE OF THE INVENTION

Problems to be Solved by the Invention

Generally, as a game system utilizing a jackpot drawing apparatus, there is known that in which when a predetermined drawing start condition is satisfied, a drawing performance for a jackpot drawing is carried out in a game apparatus of a certain player, allowing the player to develop a sense of expectation that the player may win the jackpot award. In this way, in that game system, there is a special arrangement to liven up the jackpot drawing.

However, the jackpot award is set so that the number of tokens to be paid out at the time of winning is large but its winning probability is very low. Thus, there is a problem that the player often reaches a wrong conclusion that the player loses the game again even if the player receives the drawing performance, and the player cannot obtain an effect allowing the player to develop a sense of expectation that the player may be able to win the jackpot award.

It is noted that the game system utilizing the jackpot drawing apparatus can be installed in not only a gaming arcade and the like, but also utilized for a pachinko machine or a slot machine installed in a pachinko parlor, etc. Such a game system also encounters the problem described above.

The present invention realizes and provides a game system capable of allowing a player to develop a sense of great expectation that the player can win a jackpot award, and a notification processing apparatus constituting the same.

Means for Solving the Problem

As an aspect of the present invention, it is listed that a game system including two or more game apparatuses, each of which comprises a game progress control unit for performing game progress control, comprising: a jackpot drawing apparatus that includes: a drawing unit for carrying out a jackpot drawing for determining whether the players who play by using the two or more of game apparatuses win a jackpot award or lose so that no player wins the jackpot award; a storage unit for storing payout amount data indicating an amount including a payout target amount to be paid out to the winning player when the drawing unit determines winning of the jackpot award; a payout processing unit for performing a payout process for paying out to the winning player a payout target of at least a part of an amount that is indicated by the payout amount data obtained by reading out the payout amount data from the storage unit, when the drawing unit determines winning of the jackpot award; and a payout amount increasing unit for cumulatively increasing the amount indicated by the payout amount data stored in the storage unit when a predetermined payout amount increasing condition is satisfied; and a notification processing apparatus, which is connected to and capable of communicating with the jackpot drawing apparatus, for performing a jackpot award winning notification process for issuing a jackpot award winning notification issued to notify the player who wins the jackpot award determined by the drawing unit, of winning of the jackpot award, wherein when the jackpot award winning notification is issued, prior to issuing the same, the notification processing apparatus performs an advance notification process for issuing an advance notification to the effect that the player who plays by using each game apparatus belonging to a predetermined group configured by two or more game apparatuses including the game apparatus with which the player who wins the jackpot award plays is notified that the player who plays by using either game apparatus belonging to the predetermined group wins the jackpot award.

In this game system, an advance notification is issued to a player who plays by using each game apparatus belonging to a predetermined group configured by a part or a whole of two or more game apparatuses constituting the present system. The advance notification is to previously notify that the player who plays by using either game apparatus belonging to that group wins a jackpot award, before issuing a jackpot award winning notification. Irrespective of whether it is true or not, the player who receives the advance notification normally thinks that a probability that the player him/herself wins depends on a proportion obtained by dividing the number of players belonging to the predetermined group. This probability is higher than a probability of winning the jackpot award because there is a loss in the jackpot drawing. Therefore, as compared to a case where a drawing performance for the jackpot drawing is merely carried out for the player without issuing the advance notification (that is the case of the conventional technology), it is possible to increase a sense of expectation developed by the player that the player him/herself may win the jackpot award.

In the above-described game system, the game system may comprise the three or more game apparatuses, wherein the predetermined group may comprise two or more game apparatuses that are a part of the three or more game apparatuses provided in the game system.

As described above, irrespective of whether it is true or not, the player who receives the advance notification normally thinks that a probability that the player him/herself wins depends on a proportion obtained by dividing the number of players belonging to the predetermined group. In the game system, a predetermined group to which the advance notification is issued comprises a part of two or more game apparatuses constituting the present system, and thus, as compared to a case where the predetermined group comprises all the game apparatuses constituting the present system, the player will think that a probability that the player him/herself wins is high. Therefore, according to the present game system, as compared to a case where the predetermined group comprises all the game apparatuses constituting the present system, it is possible to increase a sense of expectation that the player him/herself may win the jackpot award.

In the above-described game system, the drawing unit of the jackpot drawing apparatus may carry out the jackpot drawing by carrying out a group drawing for determining whether the predetermined group is selected or a loss is established in which neither group is selected from previously determined two or more groups each being configured by two or more game apparatuses, and by carrying out a winner drawing for determining the player who wins the jackpot award from the players who play by using two or more game apparatuses belonging to the predetermined group, when the predetermined group is selected by the group drawing.

In the game system, a jackpot drawing for determining winning of the jackpot award is formed by two stages, i.e., after a group drawing is carried out, a winner drawing for determining the winner for the jackpot award is carried out. Thereby, the drawing process for determining winning of the jackpot award can be processed by dividing it into the group drawing and the winner drawing. Therefore, even when constructing a large-scale game system including a large number of game apparatuses, it is possible to avoid a failure such as a decrease in performance of a whole system caused by process concentration.

In the above-described game system, the payout processing unit of the jackpot drawing apparatus may perform, when the drawing unit determines winning of the jackpot award, a small-amount payout process for paying out a payout target to the player who plays by using at least a part of the game apparatuses belonging to the predetermined group, the payout target having an amount smaller than a payout amount paid out when winning of the jackpot award is determined.

In this game system, in a predetermined group in which the winner for the jackpot award is produced, even a player who cannot become the winner for the jackpot award can receive a payout of a predetermined amount of a payout target. Therefore, in the present game system, it is possible for the player who receives the advance notification to develop not only a sense of expectation that the player him/herself may win the jackpot award but also a sense of expectation that the player may receive the payout of a predetermined amount of a payout target even if the player cannot win the jackpot award. Therefore, it is possible to further increase a sense of expectation that the player who receives the advance notification may acquire the payout target.

In the above-described game system, the drawing unit of the jackpot drawing apparatus may serve as a drawing unit for carrying out, in addition to the jackpot drawing, a payout award drawing for determining a player who receives, as a payout award, the payout of the payout target having a smaller amount than the payout amount paid out when the winning of the jackpot award is determined from the players who play by using the game apparatus belonging to the predetermined group, the payout processing unit of the jackpot drawing apparatus may perform the small-amount payout process on the winner when the drawing unit determines the winner for the payout award, and the notification processing apparatus may perform a payout award winning notifying process in which the drawing unit performs a payout award winning notification that is to notify the winner of the payout award, of the winning of the payout award, after the advance notification is issued.

In this game system, in a predetermined group in which the winner for the jackpot award is produced, even a player who cannot become the winner for the jackpot award can receive the payout of a predetermined amount of a payout target if the player wins a payout award. Therefore, in the present game system, it is possible for the player who receives the advance notification to develop not only a sense of expectation that the player him/herself may win the jackpot award but also a sense of expectation that the player may win the payout award even if the player cannot win the jackpot award. As a result, it is possible to increase the sense of expectation held by the player who receives the advance notification.

In the above-described game system, the notification processing apparatus may perform the jackpot award winning notifying process so that the jackpot award winning notification is issued after the payout award winning notification is issued.

In this game system, by delaying the winning notification of the jackpot award in which a larger amount of a payout target can be acquired, it is possible to amplify a sense of expectation (that is developed by the advance notification) that the player him/herself may win the jackpot award.

In the above-described game system, when the drawing unit determines the winner for the jackpot award and the winner for the payout award, the payout processing unit may perform a payout process for paying out a payout target having a part of an amount indicated by the payout amount data that is read out from the storage unit, to the player who wins the jackpot award, and at the same time, and performs, as the small-amount payout process, a payout process for paying out a payout target having a remaining amount of the amount indicated by the payout amount data that is read out, to the player who wins the payout award.

In this game system, there is no need of managing a payout rate for the payout award other than the payout rate management about the jackpot award, and thus, managing the payout rate becomes easy.

In the above-described game system, each game apparatus may comprise a performance unit for carrying out a performance visually and audibly appealing to the player, and the game progress control unit provided in each game apparatus is for carrying out game performance control according to game progress by controlling the performance unit, the advance notification process performed by the notification processing apparatus may be a process for issuing the advance notification by an advance notification performance that is carried out by using the performance unit provided in each of the two or more game apparatuses belonging to the predetermined group, the notification processing apparatus may comprise a control command transmitting unit that is connected to and capable of communicating with each game apparatus and that is for transmitting a performance control command for carrying out the advance notification performance at a predetermined performance timing to the two or more game apparatuses belonging to the predetermined group, and each game apparatus may comprise an advance notification performance control unit for controlling the performance unit according to the performance control command from the notification processing apparatus so as to perform advance notification performance control for carrying out a performance that serves a part of the advance notification performance at the predetermined performance timing.

In this game system, when a performance unit used by two or more game apparatuses belonging to a predetermined group for performance for each game is caused to perform a performance that serves a part of an advance notification performance, it becomes possible to perform a single total performance (advance notification performance) in which the two or more game apparatuses belonging to the predetermined group are linked. Then, by using this total performance, it becomes possible to inform the player of the fact that the player who plays by using either game apparatus belonging to the predetermined group has won the jackpot award. The total performance is carried out by the performance unit of each game apparatus belonging to the predetermined group, and thus, it is effective to direct the conscious of the player who plays by using these game apparatuses toward the jackpot drawing.

As another aspect of the present invention, it is listed that a notification processing apparatus for issuing a winning notification of a jackpot award, connected to and capable of communicating with a jackpot drawing apparatus, the jackpot drawing apparatus comprising: a drawing unit for carrying out a jackpot drawing for determining whether players who play by using two or more game apparatuses win the jackpot award or lose so that no player wins the jackpot award; a storage unit for storing payout amount data indicating an amount including a payout target amount to be paid out to the winning player when the drawing unit determines the winning of the jackpot award; a payout processing unit for performing a payout process for paying out to the winning player a payout target of at least a part of an amount that is indicated by the payout amount data obtained by reading out the payout amount data from the storage unit when the drawing unit determines the winning of the jackpot award; and a payout amount increasing unit for cumulatively increasing the amount indicated by the payout amount data stored in the storage unit when a predetermined payout amount increasing condition is satisfied, wherein the notification processing apparatus and the jackpot drawing apparatus are connected and capable of communicating with each other, the notification processing apparatus performs a jackpot award winning notification process for issuing a jackpot award winning notification issued to notify the player who wins the jackpot award determined by the drawing unit of the jackpot drawing apparatus, of winning of the jackpot award, and when the jackpot award winning notification is issued, prior to issuing the same, an advance notification process for issuing an advance notification to the effect that the player who plays by using each game apparatus belonging to a predetermined group configured by two or more game apparatuses including the game apparatus with which the player who wins the jackpot award plays, is notified that the player who plays by using either game apparatus belonging to the predetermined group wins the jackpot award is carried out.

In the notification processing apparatus, when working together with two or more game apparatuses and a jackpot drawing apparatus, the player who receives an advance notification can be made to develop a sense of great expectation that the player him/herself may win the jackpot award.

Effect of the Invention

According to the present invention, a player can be made to develop a sense of great expectation that the player him/herself may win a jackpot award.

DESCRIPTION OF REFERENCE NUMERALS

1000 Horse-racing game machine
1010 Station
1011 Display
1101 Main control device
1108, 2625, 3107, 4003, 5003 External communication device
1201 Station control device
2000 Pusher game machine
2001 Satellite drawing apparatus
2002 Center drawing apparatus
2500 Play field
2601, 2611, 2621 Control device
2700 Display unit
3000 Slot machine
3011 Performance panel
3101 Control device
4000 Management server
4001 Control device
5000 Gaming arcade server
5001 Control device

BEST MODE FOR CARRYING OUT THE INVENTION

The following description will explain one embodiment applied to a game system configured with three types of token-operated game machines as arcade game machines (business-use game apparatuses) having game contents different from each other, and a gaming arcade server and a management server that are jackpot drawing apparatuses connected to and capable of communicating with these token-operated game machines. It is noted that the gaming arcade server functions as a notification processing apparatus.

[System Overview]

First, the configuration of a whole game system according to the present embodiment will be explained.

Figure 1:
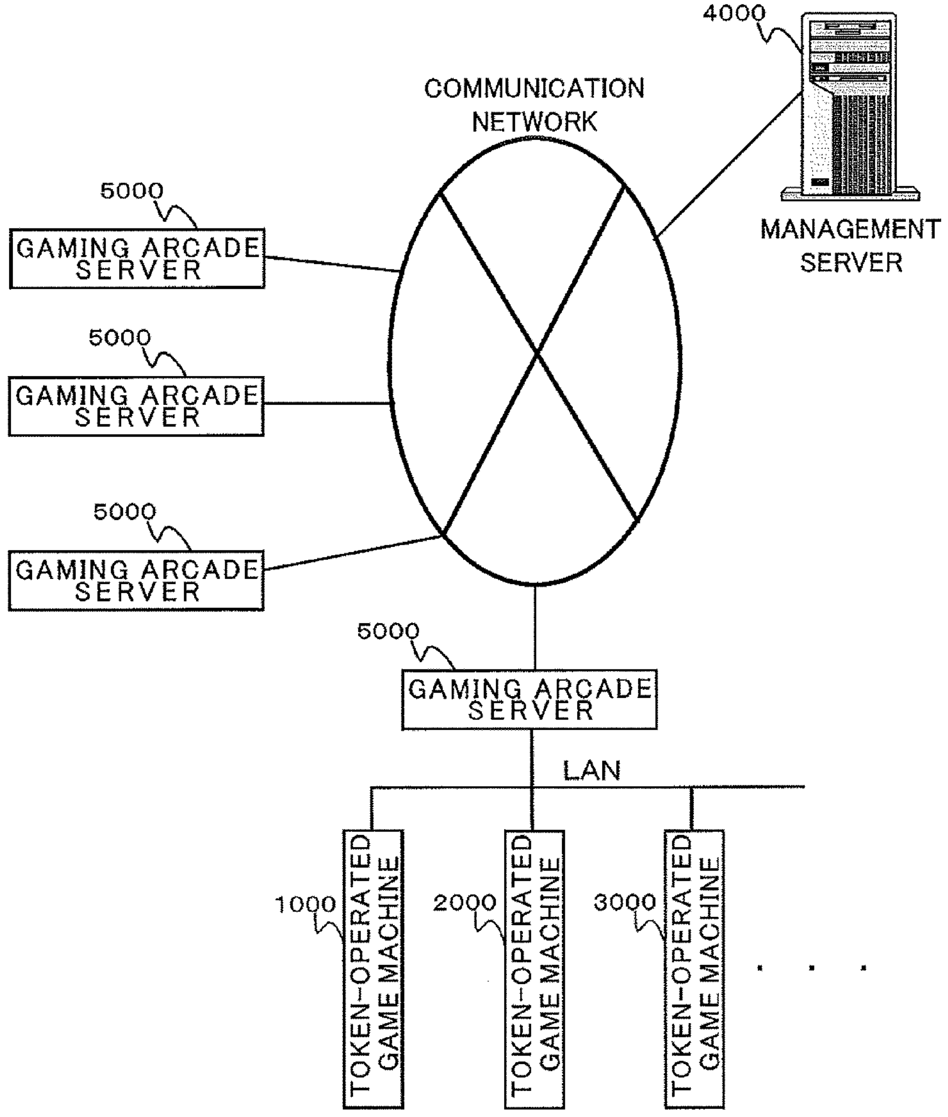
FIG. 1 is a schematic configuration diagram of a whole game system according to an embodiment.

FIG. 1 is a schematic configuration diagram of the whole game system according to the present embodiment.

Three types of token-operated game machines 1000, 2000, and 3000 constituting the game system are different types of game machines having hardware configurations different from each other. In the present embodiment, the token-operated game machines 1000, 2000, and 3000 are installed in a game facility such as a game center, etc., and connected to a gaming arcade server 5000 in the gaming arcade via a LAN (Local Area Network) that is a high-speed communication network. A management server 4000 is connected to the gaming arcade server in each gaming arcade, via a WAN (Wide Area Network) that is a low-speed communication network. The management server 4000 performs data communication with the gaming arcade server that performs system management for the whole gaming arcade by performing data communication with each of the token-operated game machines 1000, 2000, and 3000 so as to manage the whole game system. It is noted that a game system covering a plurality of gaming arcades will be explained in the present embodiment; the explanation, however, will be applied also to a game system within a single gaming arcade.

Next, the configuration and the operation of each of the token-operated game machines 1000, 2000, and 3000 will be explained.

[Horse-Racing Game Machine 1000]

The token-operated game machine 1000 is a horse-racing game machine.

In the horse-racing game machine 1000, one or at least two players predict an order of arrival for a horse race played in the horse-racing game machine, and when the prediction is correct, the player is capable of receiving a token payout according to odds against that order.

Figure 2:
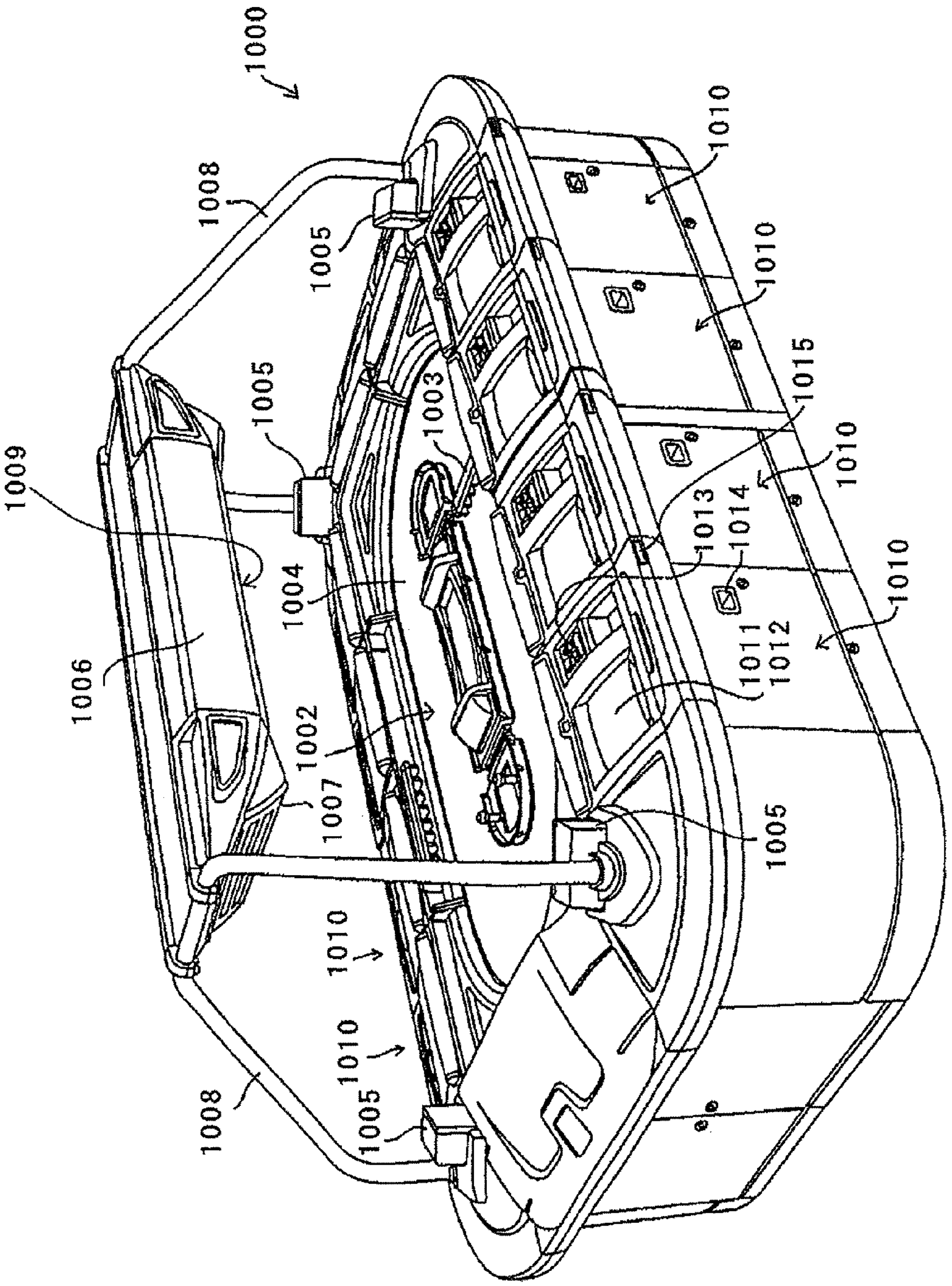
FIG. 2 is an outline view showing one example of a horse-racing game machine constituting the same game system.

FIG. 2 is an outline view showing one example of the horse-racing game machine 1000.

The horse-racing game machine 1000 is provided with a field unit 1002 arranged at the center portion and a plurality of stations 1010 as game apparatuses arranged to surround the field unit 1002. In the field unit 1002, a field surface 1004 as a moving surface that resembles turf on a race track on which a starting gate 1003 as a model is installed, is arranged, and when a plurality of model horses (not shown) are moved within the field surface 1004, a race is developed. Around the field unit 1002, a plurality of speakers 1005 for providing live race coverage, cheers, etc., are placed. Above the field unit 1002, placed are: a display unit 1006 for displaying, for example, a total accumulated token count indicating the number of pieces to be paid out for a total jackpot drawing described later; an illuminating device 1007 for illuminating the field unit 1002; and a camera 1009 that is an imaging unit functioning as imaging means for imaging the field unit 1002. The display unit 1006, the illuminating device 1007, and the camera 1009 are supported by a support column 1008. The speaker 1005 and the illuminating device 1007 that are performance units functioning as performance means of the horse-racing game machine 1000.

In the station 1010, a display 1011 for displaying thereon a game screen according to the progress of the game, and a touch panel 1012 overlapped on a display surface of the display 1011, are arranged. When a player touches a predetermined position of the game screen displayed on the display 1011 according to an instruction on the game screen, the position is detected by the touch panel 1012 and an operation content of the player is recognized by the horse-racing game machine 1000. In the station 1010, further arranged are: a token drop-in unit 1013 into which a token is dropped in by the player; a token payout opening 1014 from which the token is paid out to the player; and a magnetic-card inserting slot 1015 into which a magnetic card for recording thereon data that becomes necessary when the game is resumed is inserted.

In the horse-racing game machine 1000, races having the same titles as those of actual horse races held by the Japan Racing Association are sequentially held according to a predetermined cycle. For races held during one year, about 60 races are prepared, and for each race, a time for betting a token, i.e., a time for purchasing a betting ticket; a time during which a race is held by model horses; and a time for displaying race results are secured. The player predicts the order of arrival for each race, and is capable of freely purchasing a betting ticket. The purchasing of the betting ticket is carried out by betting a token, and when the purchased betting ticket matches the results of the race, the player is paid out, as a dividend, tokens of which the number of pieces corresponds to that obtained in accordance with the number of pieces of tokens to be bet and odds.

In the horse-racing game machine 1000 in the present embodiment, the field unit 1002 forms the field surface 1004, and on the field surface 1004, an artificial lawn resembling an actual turf and models such as a starting gate 1003, etc., are arranged. A model horse as a moving body is moved on the field surface 1004.

Figure 3:
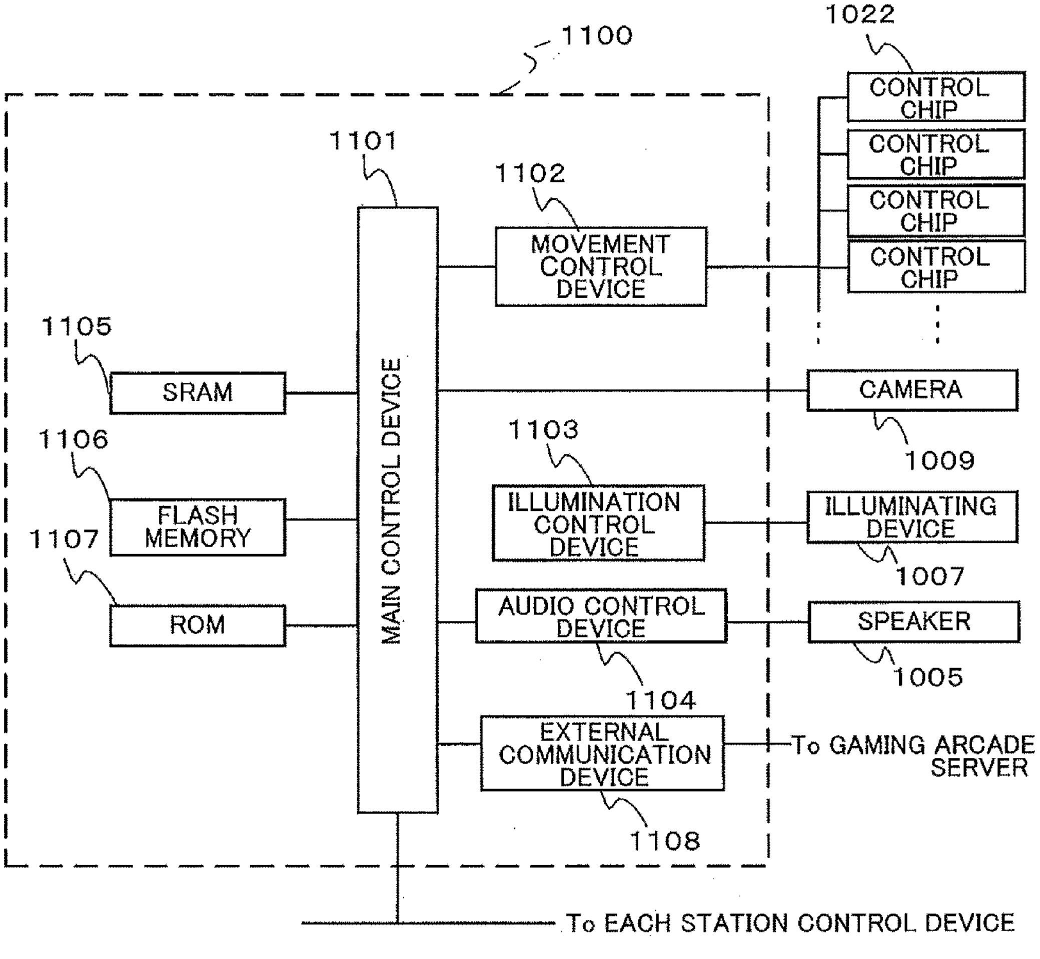
FIG. 3 is a control block diagram showing a main control unit for controlling a whole operation of the same horse-racing game machine in an integrated way.

FIG. 3 is a control block diagram showing a main control unit for controlling the whole operation of the horse-racing game machine 1000 in an integrated way.

Figure 4:
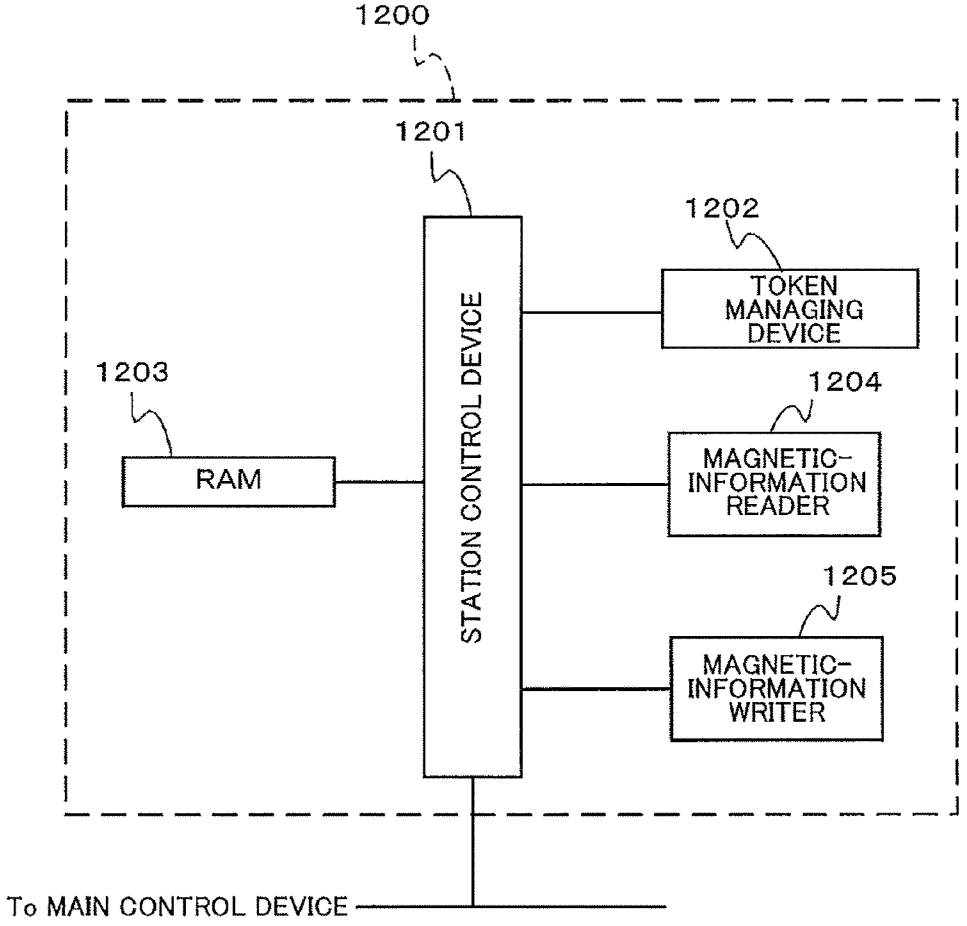
FIG. 4 is a control block diagram showing a station control unit arranged in each station of the same horse-racing game machine.

FIG. 4 is a control block diagram showing a station control unit arranged in each station 1010.

As shown in FIG. 3, the main control unit 1100 placed on the field unit side is provided with: a main control device 1101; a movement control device 1102 for controlling a movement of the model horse in the field unit 1002; an illumination control device 1103 for controlling the illuminating device 1007; an audio control device 1104 for controlling the cheers, the live coverage, etc., provided by the speaker 1005; an SRAM 1105 and a flash memory 1106 for temporarily recording data processed by the main control device 1101; a ROM 1107 in which a program necessary for the game and various types of databases are stored; and an external communication device 1108 for performing data communication via a LAN with an external device such as the gaming arcade server 5000. The main control device 1101 is connected to each of the movement control device 1102, the illumination control device 1103, the audio control device 1104, the SRAM 1105, the flash memory 1106, the ROM 1107, the external communication device 1108, and the camera 1009. In the ROM 1107, a movement control program that is movement control information for each model horse, various types of data relating to each horse used for the race, a database for a race schedule, etc., are stored.

As shown in FIG. 4, the station control unit 1200 arranged in each station 1010 is provided with: a station control device 1201; a token managing device 1202 for managing a payout of the token and any other similar task; a RAM 1203 for temporarily recording various types of data of the player; a magnetic-information reader 1204 for reading the magnetic information of the magnetic card inserted into the magnetic-card inserting slot 1015; and a magnetic-information writer 1205 for writing various types of information such as an ID code into the magnetic card. The station control device 1201 is connected to each of the token managing device 1202, the RAM 1203, the magnetic-information reader 1204, and the magnetic-information writer 1205. The station control device 1201 is also connected to each of units such as: the display 1011 and the touch panel 1012 (shown in FIG. 2) arranged in the station 1010; a token drop-in sensor (not shown) for detecting the token dropped in via the token drop-in unit 1013; and a magnetic-card driving device (not shown) for driving the magnetic card inserted into the magnetic-card inserting slot 1015.

Furthermore, as shown in FIG. 3 and FIG. 4, the station control device 1201 of each station 1010 is connected to the main control device 1101 on the game machine main body side, enabling data communication necessary between these components.

The main control device 1101 of the main control unit 1100, in order to realistically reproduce an actual horse race when holding a race, changes a movement control content of each model horse for each race according to various types of data such as a parameter of each horse. Then, the movement control content is determined before the start of a race, and the movement of the model horse is controlled according to the resultant movement control content. Concretely, before the start of a race, the main control device 1101 of the main control unit 1100 reads out various types of parameters of horses competing in the current race and data such as turf condition, from the ROM 1107, so as to determine the order of arrival for the current race. It is noted that only a first place horse and a second place horse affect the payout of the token to the player, and thus, it is not necessary to determine the orders of all the horses competing in that race and it suffices to determine at least the first place horse and the second place horse. In this case, the movement of the other horses is controlled according to the various types of parameters so that the other horses do not arrive at the finish line first or second. Order of arrival data, the parameter of each horse, etc., determined by the main control device 1101 are forwarded to the movement control device 1102.

The movement control device 1102 that receives the data from the main control device 1101 executes the movement control program recorded in a ROM (not shown) so as to perform movement control on each horse. The movement control device 1102 executing the movement control program calculates a moving pattern of each horse from the parameter, etc., of each horse, and transmits a control command to each control chip 1022 so that each model horse 1060 is moved according to the resultant moving pattern. Concretely, in order to generate a magnetic field allowing each model horse 1060 to move according to the moving pattern of each horse, a control command is transmitted to the control chip of each circuit board for magnetic field generation. Each control chip 1022 that receives the control command controls a current that passes through each coil so that a magnetic force that pulls a south pole of a permanent magnet of each model horse 1060 along a planned moving route of each model horse 1060 is sequentially generated. Thereby, each model horse 1060 can be moved along the planned moving route. As a result, each model horse 1060 of which the movement is controlled by the movement control device 1102 develops the race in the play field.

[Pusher Game Machine 2000]

Next, the token-operated game machine 2000 will be explained.

The token-operated game machine 2000 is a pusher game machine.

Figure 5:
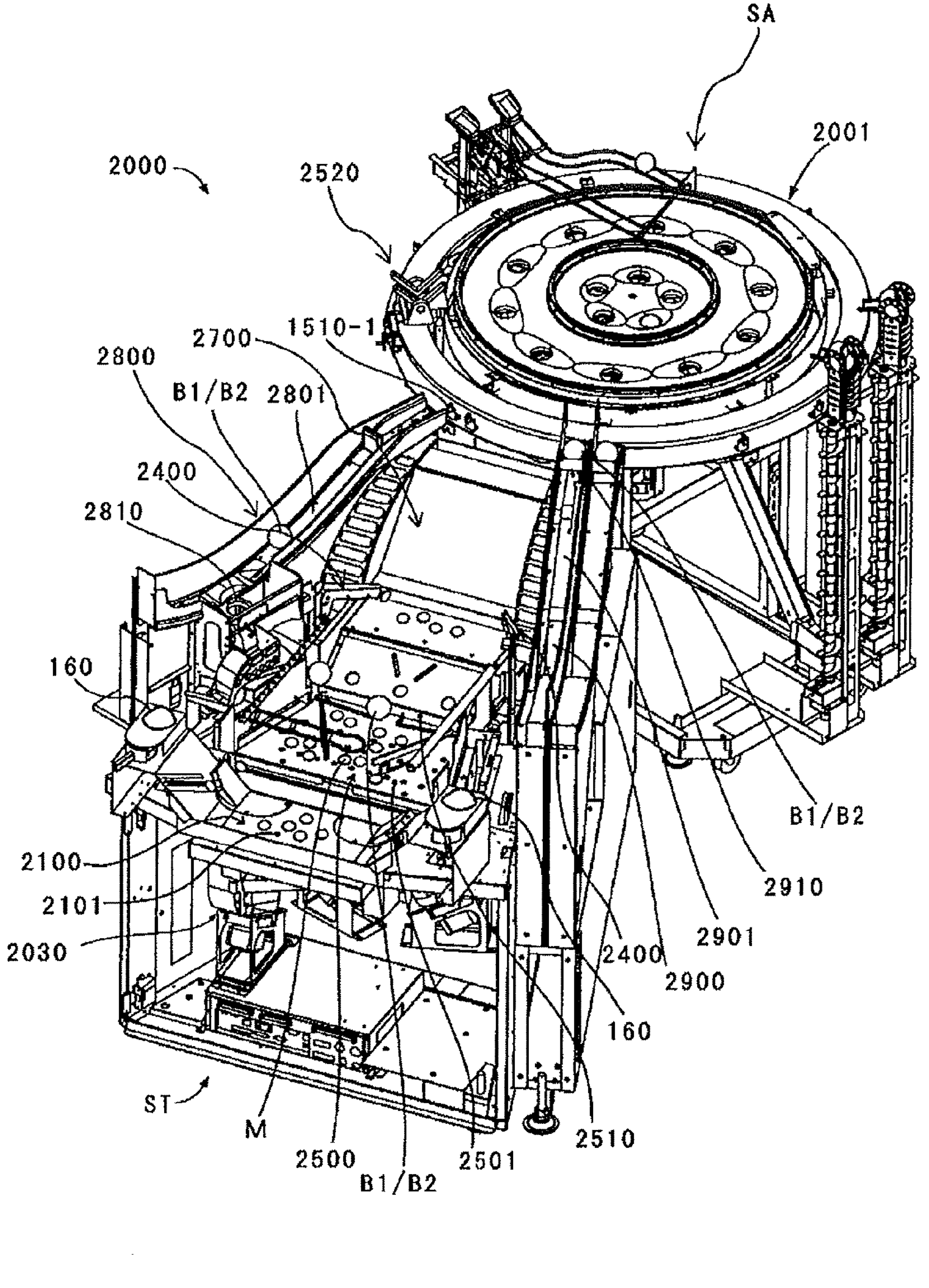
FIG. 5 is an explanatory view for explaining the configuration of a station unit in a pusher game machine constituting the same game system.

FIG. 5 is an explanatory view for explaining the configuration of a station unit ST in the pusher game machine 2000.

In the pusher game machine 2000, four satellite units SA as game apparatuses are arranged to surround a center drawing apparatus (not shown). Each satellite unit SA is provided with the four station units ST, and each player is to individually play a game at each station unit ST. Moreover, each satellite unit SA is provided with one satellite drawing apparatus 2001, and around the satellite drawing apparatus 2001, each station unit ST is lined and placed.

The station unit ST is configured mainly by: a token drop-in mechanism (drop-in unit) 2100; a play field 2500; a station control unit (not shown); and a display unit 2700. In the station unit ST, the token drop-in mechanism 2100 is placed on an upper near side, the display unit 2700 that functions as display means is placed on an upper far side, and the play field 2500 is placed at an upper center. The "near side" means a side on which the player is positioned during the game, the "far side" means a side opposite to the side on which the player is positioned during the game, and the "center" means an area between the "near side" and the "far side."

The token drop-in mechanism 2100 is a mechanism for the player to drop a token M into the pusher game machine 2000 during the game. The token M dropped into the token drop-in mechanism 2100 is conveyed via a token conveyance route (not shown) in the interior of the cabinet of the station unit ST to a lift-up hopper, and the resultant token M is temporarily retained by the lift-up hopper. The lift-up hopper includes: a token retaining unit for accumulating the token M; the lift-up unit for lifting up the token M to a predetermined height; and a token discharge unit (discharge unit) for discharging the token M that is lifted up at a predetermined timing. At a discharge opening of the token discharge unit, arranged is a token discharge route 2400 for leading the discharged token M to the play field 2500 in a manner to laterally swing. An upper end of the lift-up unit is placed above the play field 2500. As a result, the token discharge unit arranged at the upper end of the lift-up unit is placed above the play field 2500. Therefore, the token M temporarily accumulated in the token retaining unit arranged below the play field 2500 is raised above the play field 2500 by the lift-up unit, and thereafter, the raised token M is exited via the token discharge route 2400 from the token discharge unit, out onto the play field 2500.

Within the play field 2500, arranged mainly are: a main table 2501 that is a token mount table for retaining thereon the token M, and the pusher unit 2510 as a token extruding member which is mounted on the main table 2501. The pusher unit 2510 includes: a top surface (this is called a sub table) for retaining thereon the token M; a sloping table on which the token M that falls from the sub table slides; and a push-forward wall that pushes forward the token M retained on the main table 2501. Moreover, the pusher unit 2510, which is arranged to enable sliding on the main table 2501 in the play field 2500, makes a back-and-forth slide movement in a constant cycle or an arbitrary cycle. A part (far side) of the pusher unit 2510 is housed in a housing part (described later) arranged beneath the display unit 2700. The pusher unit 2510, which slides to come out of and into the housing part, makes a back-and-forth reciprocating movement.

With the sub table, a frame member of the display unit 2700 comes into contact in a manner to enable sliding. Therefore, when the pusher unit 2510 moves to a direction in which it is housed in the housing part, the token M on the sub table is pushed forward by the frame member. By the pushing forward, some tokens M on the sub table fall onto the sloping table. Some tokens M that fall from the sub table enter into an opening (this is called a "chucker") that is a token pass-through opening arranged on the sloping table. The remaining tokens M fall directly onto the main table 2501 and are retained on the main table 2501.

The tokens M on the main table 2501, similar to the tokens M on the sub table, are pushed forward by the slide movement of the pusher unit 2510. That is, the pusher units 2510 are seamlessly mounted on the main table 2501, and thus, when the pusher unit 2510 is moved in a discharge direction from the housing part, the tokens M on the main table 2501 are pushed forward by the push-forward wall on the front surface of the pusher unit 2510. By the pushing forward, some tokens M on the main table 2501 fall. Out of the tokens M that fall, the token M that falls from an end on the player side (this is called a "front end") to a token fall groove is paid to the player, and the other tokens M, e.g., the tokens M that fall from both sides (these are called "side ends") of the main table 2501 are stocked in a predetermined retaining unit within the station unit ST.

Besides, as shown in FIG. 5, the station unit ST includes a ball drop-in mechanism 2800 on at least one side. The ball drop-in mechanism 2800 is configured to drop balls B1 and B2 that are spherical objects (as differently shaped objects described later) into the play field 2500, and includes a ball drop-in slope 2801 and a ball drop-in position drawing mechanism 2810. The balls B1 and B2 are objects for drawing used for executing a bingo game described later.

The ball drop-in slope 2801, which is configured to lead the balls B1 and B2 dropped in from a ball carrier 2520 described later to the ball drop-in position drawing mechanism 2810 by gravity, is formed as a downhill slope. The ball drop-in position drawing mechanism 2810 is configured to draw a position on the play field 2500 onto which the balls B1 and B2 are dropped. Thus, the balls B1 and B2 dropped in from the ball carrier 2520 described later to the station unit ST are dropped in via the ball drop-in slope 2801 and the ball drop-in position drawing mechanism 2810 onto the play field 2500.

As shown in FIG. 5, the station unit ST includes a ball transportation mechanism 2900 on at least one side. The ball transportation mechanism 2900 is configured, when the balls B1 and B2 fall from the main table 2501 in the play field 2500 onto the token fall groove arranged on the near side, to transport the balls B1 and B2 to the satellite drawing apparatus 2001, and includes a ball conveying route (not shown), a ball transporting unit 2910, and a ball transporting unit traveling slope 2901. The ball conveying route is arranged below the front end of the main table 2501, and leads the balls B1 and B2 that fall from the front end to the ball transporting unit 2910. The ball transporting unit 2910 is configured to transport the balls B1 and B2 received via the ball conveying route, to the satellite drawing apparatus 2001, and travels on the ball transporting unit traveling slope 2901 according to control of the control unit of the station unit ST. The balls B1 and B2 transported to the satellite drawing apparatus 2001 are handed over to the ball carrier 2520.

Moreover, the station unit ST includes a token payout mechanism 2030, and as a result of the token payout mechanism being driven, the tokens M of which the number of pieces is equal to that of the tokens M that fall onto the token fall groove from the front end of the main table 2501 are discharged to the retaining unit 2101 of the token drop-in mechanism 2100.

Next, a control system of the pusher game machine 2000 will be explained.

Figure 6:
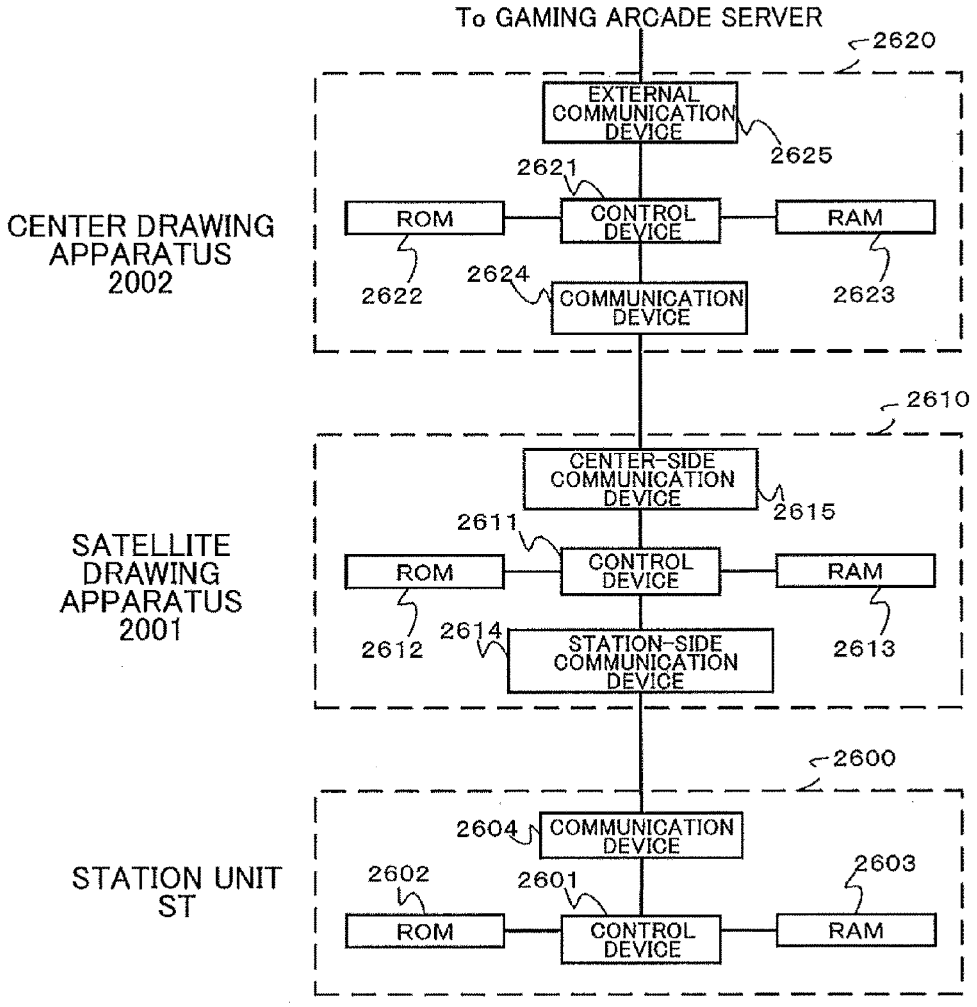
FIG. 6 is a block diagram showing a main configuration of a game control system of the same pusher game machine.

FIG. 6 is a block diagram showing a main configuration of a game control system of the pusher game machine 2000. In this block diagram, for the sake of explanation, configurations of a drive control system for driving each unit according to the game progress and any other systems are omitted.

The game control system of the pusher game machine 2000 is configured mainly by: a control unit 2600 at the station unit ST; a control unit 2610 of the satellite drawing apparatus 2001; and a control unit 2620 of the center drawing apparatus 2002. The control unit 2600 of the station unit ST mainly assumes a role of overall process control of a slot game and a bingo game described later, the control unit 2610 of the satellite drawing apparatus 2001 mainly assumes a role of control of a physical drawing of the bingo game and transportation control of the balls B1 and B2, and the control unit 2620 of the center drawing apparatus 2002 mainly assumes a role of a single-unit jackpot drawing control described later and overall control of the pusher game machine 2000.

The control unit 2600 of the station unit ST is configured mainly by: a control device 2601; a ROM 2602; a RAM 2603; and a communication device 2604. The control device 2601 executes various types of programs stored in the ROM 2602 so as to perform various types of controls. The ROM 2602 stores, for example, execution programs for various types of controls that should be carried out in the control unit 2600 of the station unit ST. The RAM 2603 is for temporarily storing various types of data or information. The communication device 2604 is for performing data communication with the control unit 2610 of the satellite drawing apparatus 2001. Although not shown, the station unit ST includes a performance unit such as a speaker and an illuminating device, used for various types of performances, and the control device 2601 controls these performance units so as to carry out various types of performances.

The control unit 2610 of the satellite drawing apparatus 2001 is configured mainly by: a control device 2611; a ROM 2612; a RAM 2613; a station-side communication device 2614; and a center-side communication device 2615. The control device 2611 executes various types of programs stored in the ROM 2612 so as to perform various types of controls. The ROM 2612 stores, for example, execution programs for various types of controls that should be carried out in the control unit 2610 of the satellite drawing apparatus 2001. The RAM 2613 is for temporarily storing various types of data or information. The station-side communication device 2614 is for performing data communication with the control unit 2600 of the each station unit ST belonging to the satellite unit SA. The center-side communication device 2615 is for performing data communication with the control unit 2620 of the center drawing apparatus 2002. Although not shown, the satellite unit SA includes a performance unit, such as a speaker and an illuminating device, used for various types of performances, and the control device 2611 controls these performance units so as to carry out various types of performances.

The control unit 2620 of the center drawing apparatus 2002 is configured mainly by: a control device 2621; a ROM 2622; a RAM 2623; a communication device 2624; and an external communication device 2625. The control device 2621 executes various types of programs stored in the ROM 2622 so as to perform various types of controls. The ROM 2622 stores, for example, execution programs for various types of controls that should be carried out in the control unit 2620 of the center drawing apparatus 2002. The RAM 2623 is for temporarily storing various types of data or information. The communication device 2624 is for performing data communication with the control unit 2610 of each satellite unit SA. The external communication device 2625 is for performing data communication via a LAN with an external device such as a gaming arcade server 5000. Although not shown, the center drawing apparatus 2002 includes a performance unit, such as a speaker and an illuminating device, used for various types of performances, and the control device 2621 controls these performance units so as to carry out various types of performances.

Figure 7:
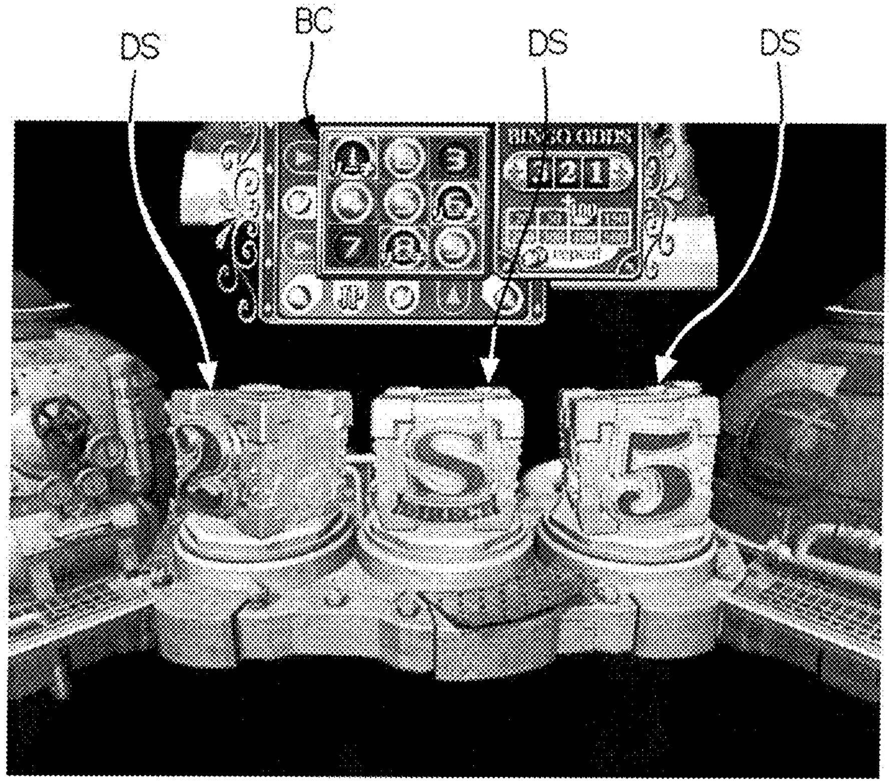
FIG. 7 is an explanatory view showing an example of a slot game screen displayed on a display unit of the same pusher game machine.
Figure 8:
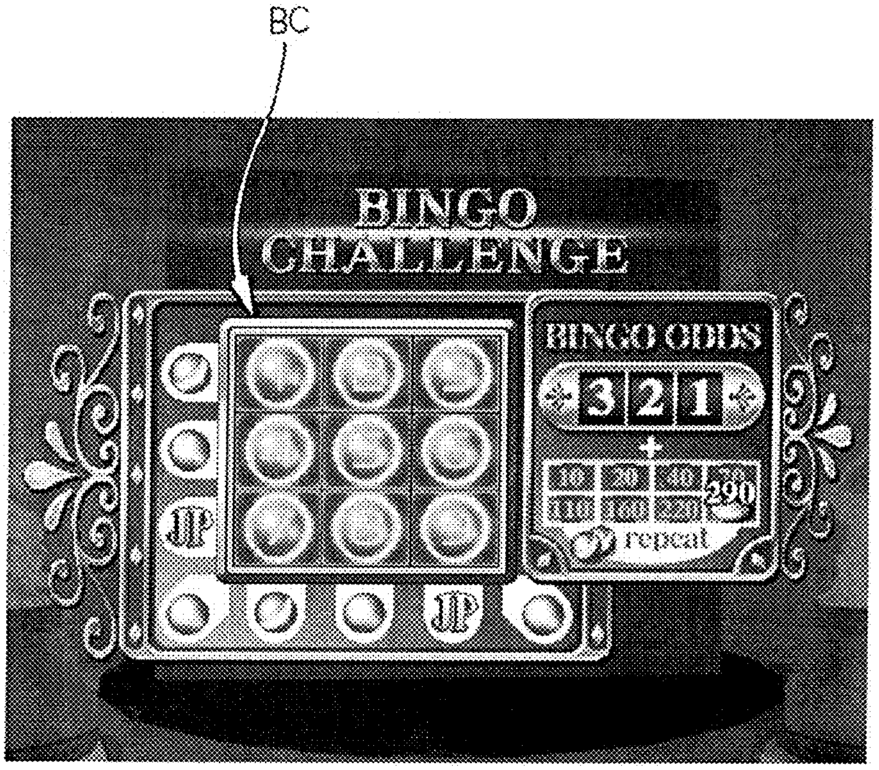
FIG. 8 is an explanatory view showing an example of a bingo game screen displayed on the display unit of the same pusher game machine.

In the above-described configuration, in the pusher game machine 2000, in addition to the pusher game, a slot game is carried out by displaying a slot game screen as shown in FIG. 7 on the display unit 2700, and a bingo game is carried out by displaying a bingo game screen as shown in FIG. 8 on the display unit 2700. In the pusher game machine 2000, a single-unit jackpot drawing using the center drawing apparatus 2002 is also carried out. On the display unit 2700, a single-unit accumulated token count indicating the number of pieces to be paid out in a single-unit jackpot drawing described later and a total accumulated token count indicating the number of pieces to be paid out in a total jackpot drawing described later are displayed.

The slot game is a digital drawing game in which the control unit 2600 at the station unit ST mainly performs a drawing digitally. This slot game is started under the condition that the token M enters into any one of chuckers arranged on the sloping table at the pusher unit 2510. The slot game screen shown in FIG. 7 is displayed on the display unit 2700 during a period when the bingo game described later does not progress. When the token M enters into any one of the chuckers and thereby the slot drawing start condition is satisfied, the control unit 2600 performs display control to rotate three dice-shaped slots DS. In the digital drawing of the slot game, the control unit executes a predetermined drawing program, and checks a generated random number in reference to a predetermined winning table so as to determine whether to win any payout-symbol combination or lose. Thereafter, where a winning payout-symbol combination is determined, the control unit 2600 performs display control to stop the rotation of the three dice-shaped slots DS so that a combination of symbols relating to the winning payout-symbol combination is stopped and displayed on the display unit 2700.

In the present embodiment, as a payout-symbol combination for a digital drawing, prepared are: a minor payout-symbol combination A in which three tokens are supplied to the play field 2500; a minor payout-symbol combination B in which eight tokens are supplied to the play field 2500; a ball supply payout-symbol combination in which the ball B1 is supplied to the play field 2500; a normal bonus payout-symbol combination in which thirty tokens are supplied to the play field 2500; a probability-change bonus payout-symbol combination in which thirty tokens are supplied to the play field 2500 and a winning table at which a winning probability is set to be higher is used in subsequent digital drawings; a direct satellite payout-symbol combination in which the ball B1 is directly supplied to the satellite drawing apparatus 2001; a direct center payout-symbol combination in which the ball B1 is directly supplied to the center drawing apparatus 2002, and other payout-symbol combinations. The winning probability of each of these payout-symbol combinations is set to be lowered according to the above-described order. It is noted that, which payout-symbol combination is prepared or to which winning probability of each of the payout-symbol combinations is set is determined arbitrarily. For example, it may be possible to configure that various benefits are given to a player such as direct payout of tokens M to the player. Then, when these payout-symbol combinations are won, the control device 2601 of the station unit ST controls the speaker or the illumination device, etc., so as to carry out individual performance to liven up the winning.

The bingo game is a physical drawing game which progresses by a physical drawing using two types of balls B1 and B2 and the satellite drawing apparatus 2001. The bingo game progresses by the control unit 2610 of the satellite drawing apparatus 2001 and the control unit 2600 at the station unit ST. In the bingo game, the control unit 2610 of the satellite drawing apparatus 2001 mainly controls a drawing for determining winning bingo numbers of the bingo game. The control unit 2600 of each of the station units ST belonging to the satellite unit SA including the satellite drawing apparatus 2001 is mainly in charge of controlling the performance of the bingo game, a decision of the establishment of BINGO, and so on. In the present embodiment, the balls B1 and B2 are moved by the satellite drawing apparatus 2001, by which a physical drawing is carried out in which one winning bingo number (a winning target) is selected from a plurality of bingo numbers (drawing targets) different from each other. In the physical drawing of the present embodiment, one winning bingo number is selected from the bingo numbers of "1" through "9". Then, array information of the bingo card having these bingo numbers of "1" through "9" arrayed in a matrix is generated individually for each of the station units ST by the control unit 2600 that is as an array-information producing unit which functions as array-information producing means for the station unit ST, for example. Thereafter, a bingo card image BC in which images of the bingo numbers of "1" through "9" (drawing target images) are arrayed according to the array information is displayed on the display unit 2700 of each of the station units ST, as shown in FIG. 8. Then, when the BINGO is established, the control device 2601 of the station unit ST or the control device 2611 of the satellite unit SA each controls the speaker, the illuminating device, etc., so as to carry out an individual performance to liven up the establishment of BINGO.

In the single-unit jackpot drawing, when either one of conditions under which the single-unit jackpot drawing is started is satisfied, i.e., the balls B1 and B2 are thrown into a winning spot to which a right of starting a single-unit jackpot drawing in the center drawing apparatus 2002 in the physical drawing in the satellite drawing apparatus 2001 in the above-described bingo game is assigned, or the center combination is directly won in the above-described slot game, the control device 2621 of the control unit 2620 in the center drawing apparatus 2002 executes a single-unit jackpot execution program stored in the ROM 2622 so as to start the single-unit jackpot drawing. Then, in the center drawing apparatus 2002, the ball B1 is moved thereby to perform the physical drawing that determines whether a single-unit jackpot award is won or lost (including a case where awards other than the single-unit jackpot award are won). When the single-unit jackpot award is won, the control device 2621 of the center drawing apparatus 2002 controls the speaker, the illuminating device, etc., so as to carry out an individual performance to liven up the winning of the single-unit jackpot award.

Moreover, when the single-unit jackpot award is won, the control device 2621 reads out the single-unit JP retaining count data that is payout amount data from the RAM 2623, and performs a process for supplying the tokens M having the number of pieces indicated by a count value of that data, to the play field 2500 of the station unit ST that has satisfied the condition under which the jackpot drawing is started. At this time, another option would be: a token supply command is output to the control device 2601 of the control unit 2600 at the station unit ST from the control device 2621, and under the control of the control device 2601, the token M is supplied to the play field 2500 by using a method similar to a normal token supply process. In this case, however, the number of pieces of tokens to be supplied when the single-unit jackpot award is won is obtained by cumulatively adding the number of pieces equivalent to a part of the number of pieces of tokens to be dropped into all the station units ST (for example, 0.03 pieces) from a time when the single-unit JP retaining count data is reset to an initial value (for example, 500 pieces), therefore, it is a great number. For this reason, instead of the normal token supply process, a process using an original token supply mechanism may be optionally adopted. This is preferable as a performance carried out when the single-unit jackpot award is won. Moreover, when the single-unit jackpot award is won, the control device 2621 resets the single-unit JP retaining count data stored in the RAM 2623, to the initial value.

[Slot machine 3000] Next, the token-operated game machine 3000 will be explained.

The token-operated game machine 3000 as a game apparatus is a slot machine.

Figure 9:
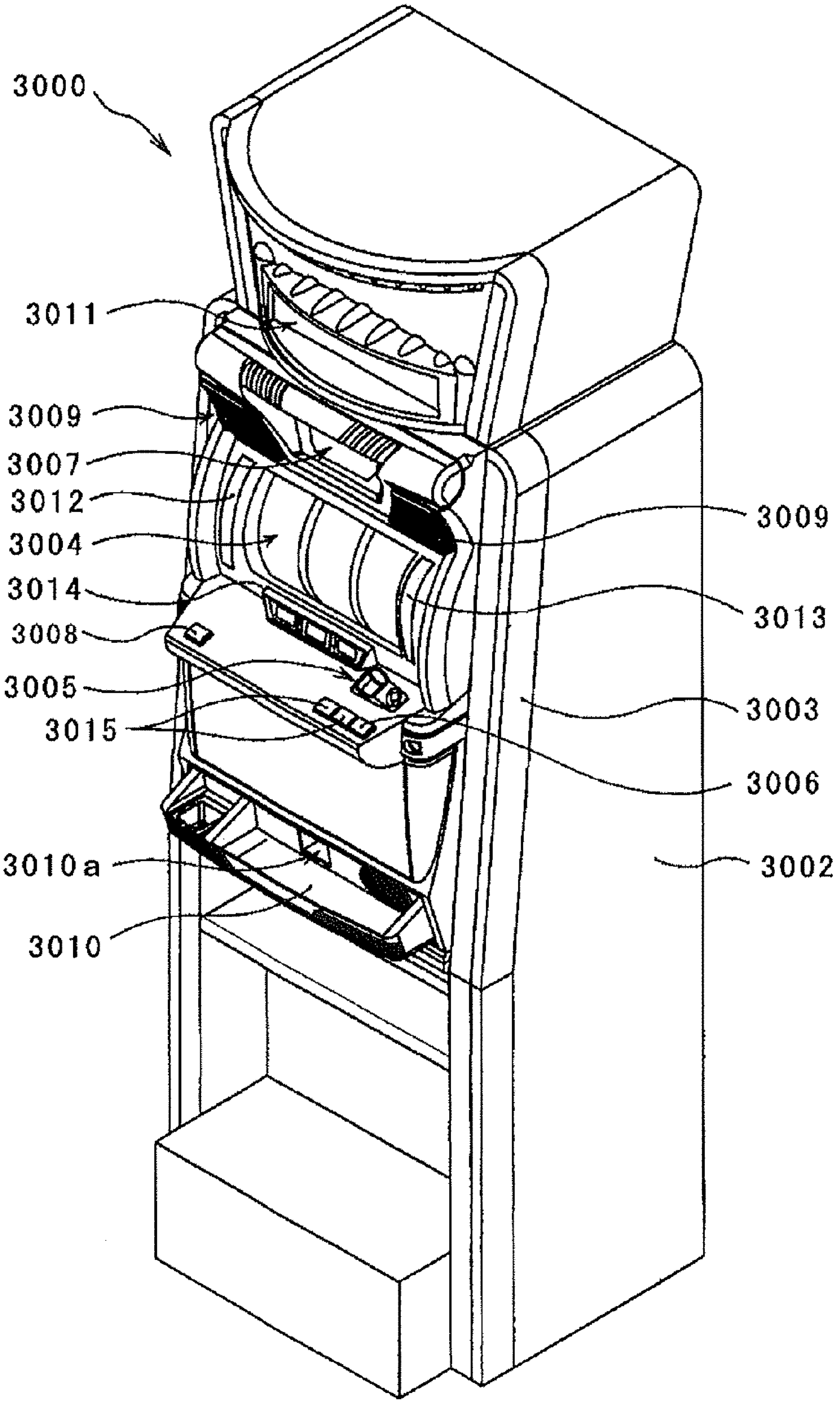
FIG. 9 is a perspective view showing the outline of a slot machine constituting the same game system.

FIG. 9 is a perspective view showing the outline of a slot machine 3000 according to the present embodiment.

The slot machine 3000 includes a box-type cabinet 3002, a front panel 3003 attached to a front surface side of the cabinet 3002 in a freely openable and closable manner, and other components. On the front panel 3003, arranged are: a display window 3004 for displaying part of a varying display unit described later; a token drop-in opening 3005; a start button 3006 as a start operation device; a dice display window 3007; a credit settlement button 3008; a speaker 3009; a token receiving tray 3010 having a token payout opening 3010*a*; a performance panel 3011; a count display unit 3014; a BET operation unit 3015; and so on. The speaker 3009 and the performance panel 3011 that are performance units function as performance means of the slot machine 3000. Moreover, on the performance panel 3011, various types of information such as a total accumulated token count indicating the number of pieces of payouts in the total jackpot drawing described later are displayed.

Inside the cabinet 3002, three reels that as three varying display units of which the outer peripheral surface is printed with a plurality of types of symbols are assembled. The three reels (hereinafter, in the order of a "left reel", a "middle reel", and a "right reel") are each rotated and driven by a reel drive motor (not shown) configured by a stepping motor. These reels are printed with a plurality of types of symbols such as "white 7", "blue 7", "green 7", "red 7", "cherry", and "blank" in a predetermined order. In the present embodiment, the symbol of "blank" configures neither one of the payout-symbol combinations. A main control circuit board on which electronic circuits are formed by various types of electronic components such as a CPU and a ROM, a token payout device having a token hopper capable of containing a large number of pieces of tokens, an internal speaker, and any other similar components are also assembled.

Figure 10:
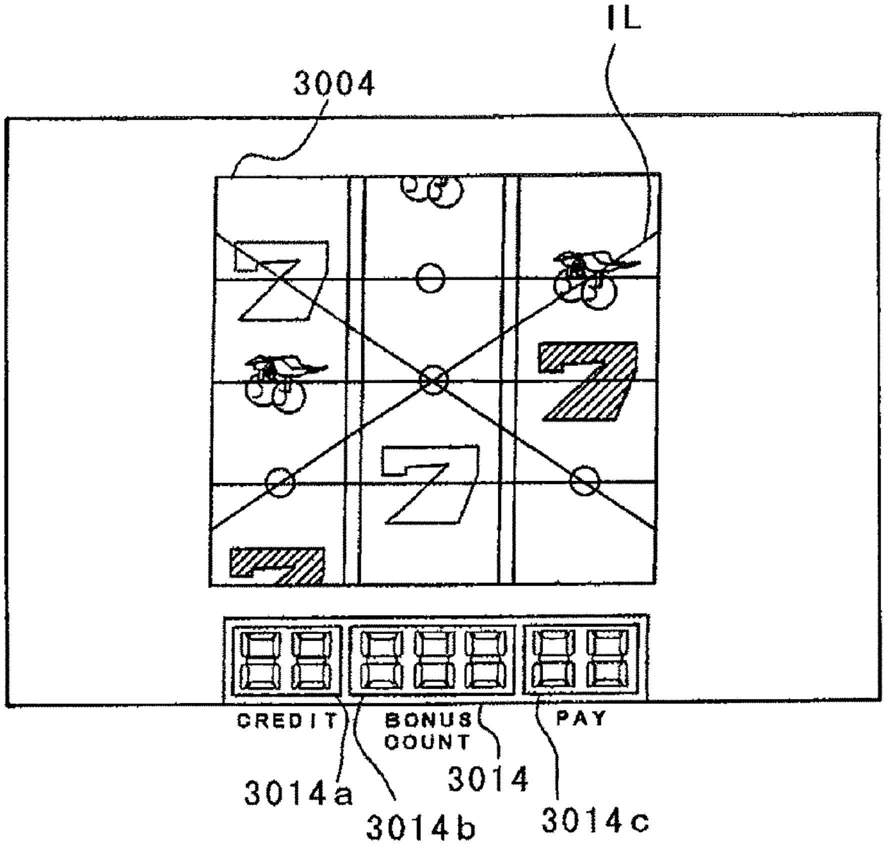
FIG. 10 is a detailed front view showing part of a front panel of the same slot machine.

FIG. 10 is a detailed front view showing part of the front panel 3003.

Symbols formed by about three images at a predetermined rotation position of each reel are to be visually recognized by a player through the display window 3004. In this display window 3004, five winning lines IL are depicted across all of the reels. When symbols relating to a payout-symbol combination corresponding to an award group previously defined on these winning lines IL become all the same in a combination (hereinafter, this is simply referred to as the "symbols become all the same in a payout-symbol combination"), a game value is imparted to a player, such as the tokens are paid out to the token receiving tray 3010 and a current period is moved to a special game period during which a special game can be played. It is noted that, in the slot machine 3000 according to the embodiment, the five winning lines IL are arranged; however, the number of winning lines may be optionally increased or decreased. Moreover, the winning line may suffice to be visually recognized by a CPU 17*a*, described later, for performing stop control of the slot machine, rather than to be visually recognized by the player.

The count display unit 3014 is provided with a credit display 3014*a*, a bonus-count display 3014*b*, a token payout count display 3014*c*, etc.

The BET operation unit 3015 is configured by two buttons, i.e., a 1BET button 3015*a* and a max BET button 3015*b*.

Figure 11:
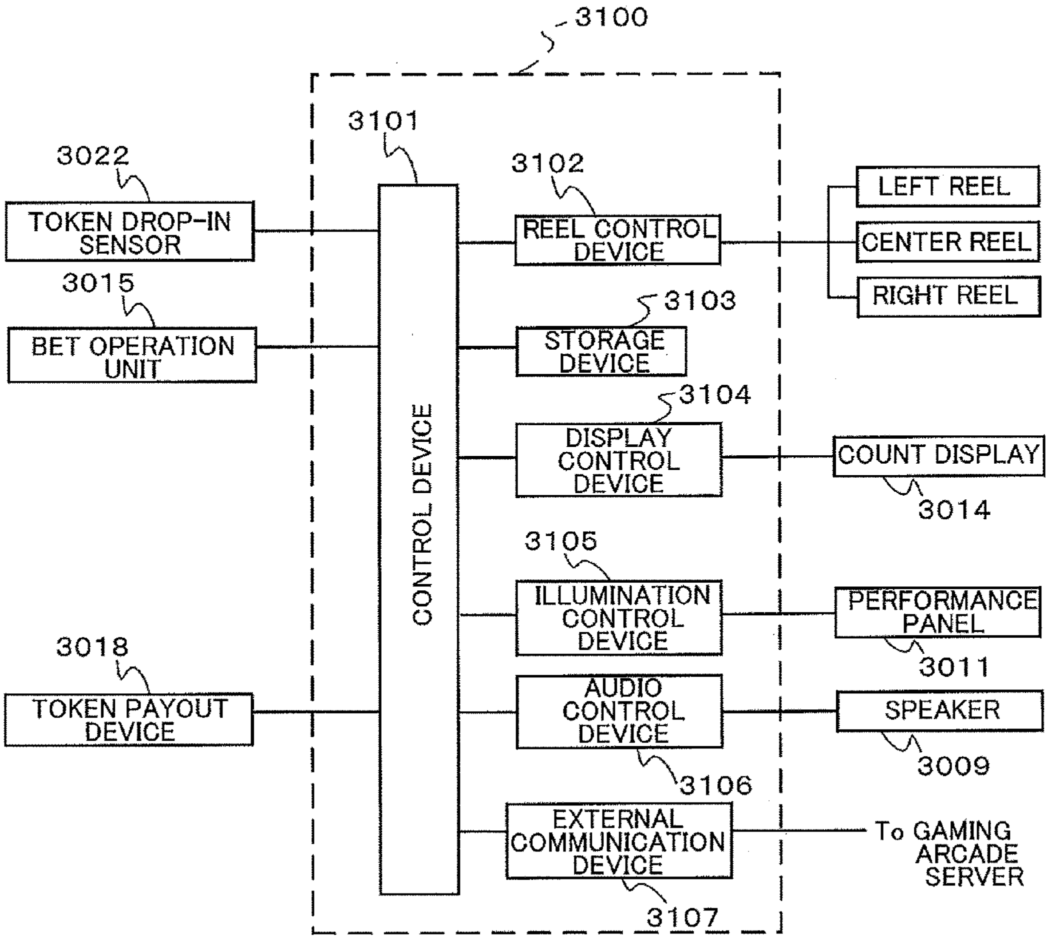
FIG. 11 is a control block diagram relating to a main configuration of the same slot machine.

FIG. 11 is a control block diagram relating to a main configuration of the slot machine 3000. The main control unit 3100 of the slot machine 3000 includes: a control device 3101; a reel control device 3102 for performing drive control for the three reels; a storage device 3103 in which various types of programs necessary for the game, various types of databases, etc., are stored; a display control device 3104 for performing display control of the count display unit 3014; an illumination control device 3105 for controlling illumination of the performance panel 3011, etc.; an audio control device 3106 for controlling a sound output from the speaker 3009; and an external communication device 3107 for performing a data communication with an external apparatus such as the gaming arcade server 5000 via a LAN. The main control device 1101 is connected not only to these devices but also to, for example, the token drop-in sensor 3022, the BET operation unit 3015, and the token payout device 3018.

Next, a flow of the game of the slot machine 3000 will be explained.

Before the game is started, as a preparation, a player first needs to drop a token into the token drop-in opening 3005. When a token is dropped by the player into the token drop-in opening 3005, the token passes through a passage (not shown) and falls onto the token hopper. In this passage, various components are arranged such as a fall opening through which a token smaller than a standard falls back to the token payout opening 3010*a*, a token block solenoid for returning or permitting the token to the token payout opening 3010*a* by blocking the passage of the token, and a token drop-in sensor 3022 configured by, for example, a photo sensor for detecting the passed tokens one by one. A token detection signal output from the token drop-in sensor 3022 that detects the token is forwarded to the control device 3101 of the main control unit 3100. In receipt thereof, by means of the display control device 3104, the control device 3101 performs control to increase a display count value by one on the credit display 3014*a* and to increase a value of credit count data stored in the storage device 3103 by one. Normally, a plurality of pieces of tokens are dropped in at once so as to increase the number of pieces of credit to a certain extent. When the player operates the BET operation unit 3015 to perform a bet operation, the control device 3101 decreases the value of the credit count data stored in the storage device 3103 by as much as the number of pieces to be bet, and at the same time, performs control to decrease the display count value on the credit display 3014*a* by as much as the number of pieces to be bet. Moreover, the control device 3101 recognizes the winning line IL that has become effective according to the number of pieces to be bet. It is noted that, unless the symbols become all the same in the payout-symbol combination on the effective winning line IL, the winning is not granted even when the symbols become all the same in the payout-symbol combination on an ineffective winning line IL.

When the start button 3006 is operated by the player, the control device 3101 that is a start-command receiving unit executes a start-command receiving program stored in the storage device 3103 thereby to function as start-command receiving means so as to receive a varying-display start command from its start button 3006. The control device 3101 that has received this varying-display start command, first, starts rotation drive of all the reels by the reel control device 3102. Further, the control device 3101 that has received the varying-display start command executes an award-group drawing program stored in the storage device 3103 so as to perform an internal drawing. In this case, the control device 3101 functions as means for performing an internal drawing to determine a winning in which any award group is selected out of a plurality of award groups or a loss in which neither award group is selected. The internal drawing is carried out by checking random number data forwarded from a random-number generating circuit with a value on an award group drawing table stored in the storage device 3103. On this award-group drawing table, each random number is associated with any award group or the loss. As a result of such an association, any one of the award groups is won at an individual predetermined probability, or the loss occurs at a predetermined probability.

Rotation positions of the reels that start the rotation drive are respectively detected by a reel position sensor (not shown). The reel control device 3102 performs an arithmetic operation on the rotation speed of the reel based on an output signal from each reel position sensor. When the rotation speed of the reel is stabilized, the reel control device 3102 becomes capable of recognizing a position of each symbol on each reel based on the output signal from each reel position sensor. Then, the control device 3101 executes a stop control program stored in the storage device 3103, and based on a drawing result of the above-described internal drawing, performs stop control of the reel by the reel control device 3102 so that a combination of predetermined symbols is stopped and displayed on the winning line. Concretely, when any one of the award groups is won by the internal drawing, the control device 3101 performs stop control so that a combination of symbols relating to a payout-symbol combination corresponding to the award group that has won is stopped and displayed on the winning line IL. On the other hand, in the case of the loss as a result of neither one of the award groups being selected by the internal drawing, the control device 3101 performs stop control so that a combination of symbols corresponding to neither award group is stopped and displayed on the winning line IL.

In a normal game, the internal drawing is carried out by using an award-group drawing table corresponding to that normal game. Examples of award groups that may be won by the internal drawing of this normal game include token payout awards of: a cherry award corresponding to a cherry combination formed by "cherry-ANY (any symbol pattern)-ANY (any symbol pattern)"; an ANY7 award corresponding to an ANY7 combination formed by a plurality of colors of "7" that are "ANY7 (any color of "7")-ANY7 (any color of "7")-ANY7 (any color of "7")"; a white 7 award corresponding to a white 7 combination formed by "white 7-white 7-white 7"; a blue 7 award corresponding to a blue 7 combination formed by "blue 7-blue 7-blue 7"; a green 7 award corresponding to a green 7 combination formed by "green 7-green 7-green 7"; and a red 7 award corresponding to a red 7 combination formed by "red 7-red 7-red 7." When any one of the token payout awards is won as a result of the internal drawing and the symbols corresponding thereto become all the same in a winning combination on the winning line IL, the control device 3101 causes the token payout count display 3014*c* of the count display unit 3014 to display the number of pieces of tokens to be paid out corresponding to the winning award. Then, the control device 3101 performs a token payout process for paying out the number of pieces of tokens corresponding to the winning award. Concretely, the control device 3101 increases a value of the credit count data stored in the storage device 3103 by as much as the number of pieces of tokens to be paid out, and at the same time, performs control to increase the token credit on the credit display 3014*a* by as much as the number of pieces of tokens to be paid out. When a token credit upper limit value is exceeded, the exceeded amount is paid out to the token receiving tray 3010 from the token payout opening 3010*a* by the token payout device 3018. According to the order in which the above-described award groups are described, the number of pieces of tokens that are paid out is larger.

[Jackpot System]

Next, the total jackpot drawing carried out in the whole system will be explained.

Figure 12:
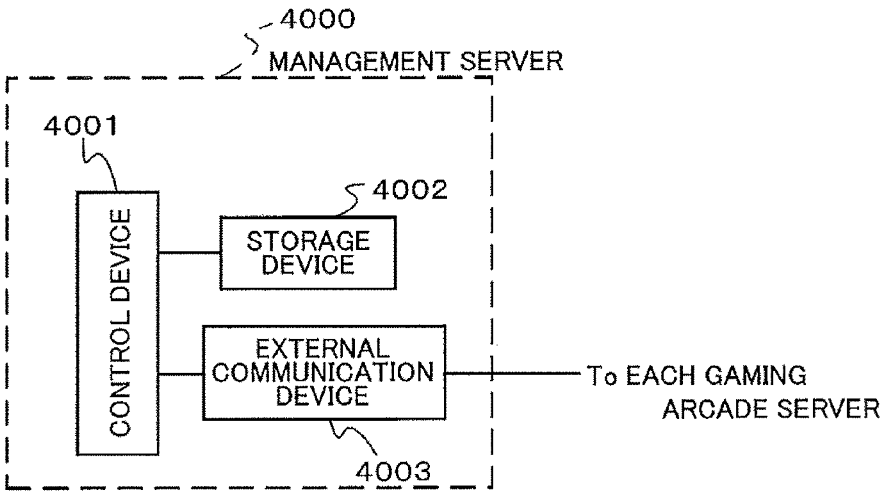
FIG. 12 is a control block diagram of a management server.

FIG. 12 is a control block diagram of the management server 4000 for performing progress control of the total jackpot drawing which is carried out together with each gaming arcade server 5000.

The management server 4000 is configured mainly by a control device 4001, a storage device 4002 and an external communication device 4003. The storage device 4002 stores various types of control programs, and stores total accumulated token count data that is payout amount data of the whole system. The external communication device 4003 is for performing data communication via a WAN with an external apparatus such as the gaming arcade server 5000 at each gaming arcade.

Figure 13:
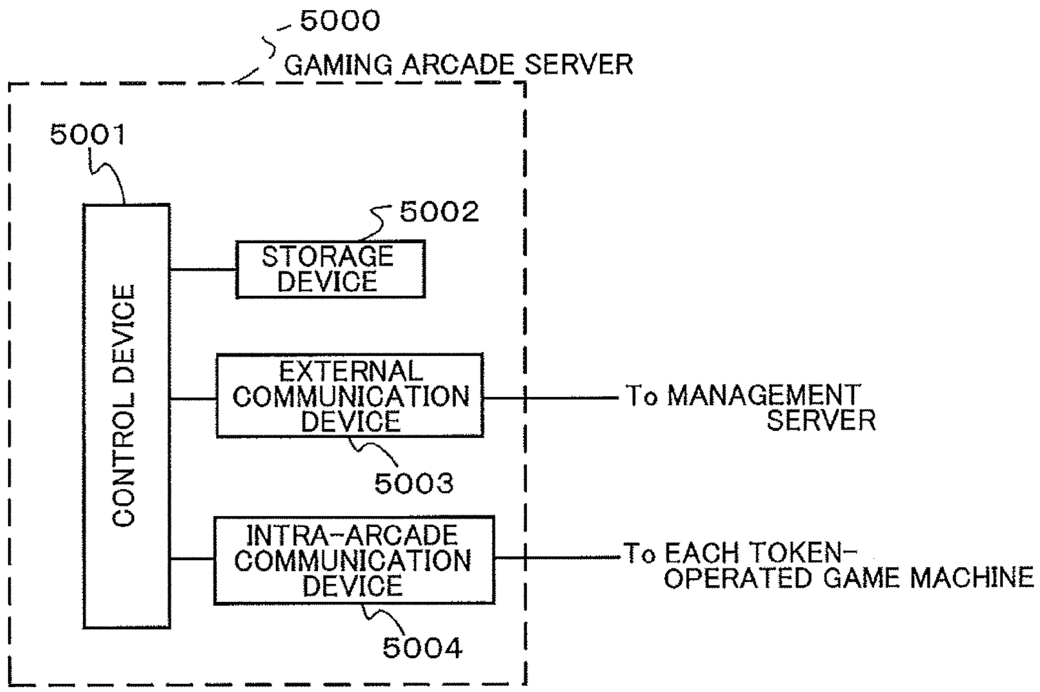
FIG. 13 is a control block diagram of a gaming arcade server.

FIG. 13 is a control block diagram of the gaming arcade server 5000 for managing a system within each gaming arcade and also performing data communication between the management server 4000 and each token-operated game machine at the gaming arcade.

The gaming arcade server 5000 is configured mainly by a control device 5001, a storage device 5002, an external communication device 5003 and an intra-arcade communication device 5004. The storage device 5002 stores various types of control programs. The storage device 5002 stores intra-arcade accumulated token count data that is a part of the tokens consumed in the token-operated game machines 1000, 2000, and 3000 within the gaming arcade constituting the game system, and also stores the total accumulated token count data forwarded from the management server 4000. The external communication device 5003 is for performing data communication via a WAN with an external apparatus such as the management server 4000. The external communication device 5003 is for performing data communication via a LAN with each of the token-operated game machines 1000, 2000, 3000, etc.

Figure 14:
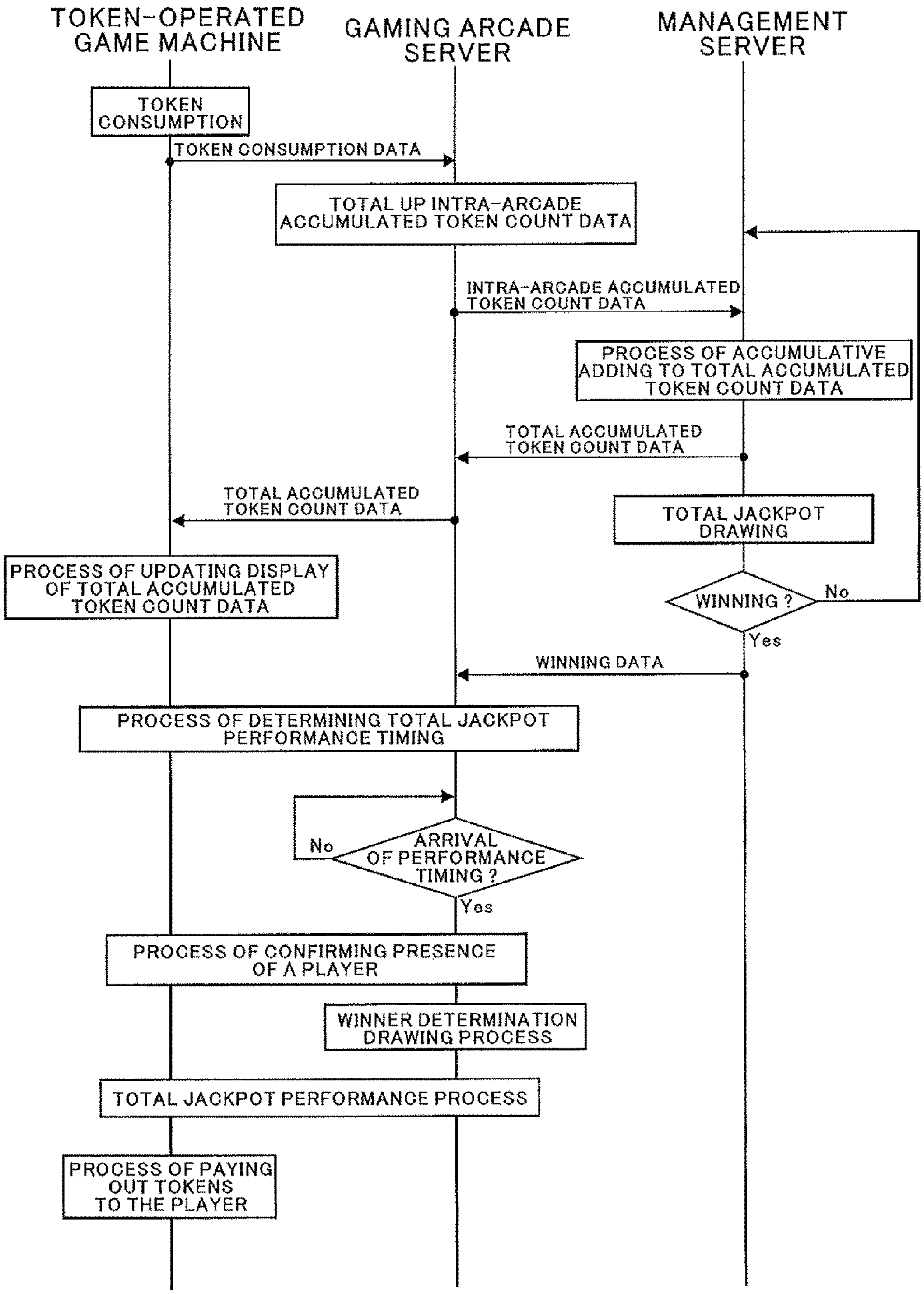
FIG. 14 is a sequence flowchart showing a flow of a total jackpot drawing.

FIG. 14 is a sequence flowchart showing a flow of the total jackpot drawing in the present embodiment. In FIG. 14, for the sake of explanation, only one token-operated game machine and one gaming arcade server are described.

In the game system, when a player consumes the tokens in each of the token-operated game machines 1000, 2000, and 3000, data indicating a consumption amount is forwarded to the gaming arcade server 5000 located in its gaming arcade. Based on the data forwarded from each of the token-operated game machines 1000, 2000, and 3000, the control device 5001 of the gaming arcade server 5000 cumulatively stores, as the intra-arcade accumulated token count data, a part of the tokens (for example, 0.01 pieces) consumed by the player in the token-operated game machines 1000, 2000, and 3000 within the gaming arcade connected to this gaming arcade server 5000 into the storage device 5002. Then, the control device 5001 transmits the intra-arcade accumulated token count data in the storage device 5002 to the management server 4000 at a predetermined timing. It is noted that the intra-arcade accumulated token count data to be transmitted this time is as much as that cumulatively stored between a last transmission time point and a current transmission time point.

At each reception of the intra-arcade accumulated token count data forwarded from each gaming arcade server 5000, the management server 4000 cumulatively adds the number of pieces of tokens indicated by the received data to the total accumulated token count data in the storage device 4002. Thereby, a part of the number of pieces of tokens (for example, 0.01 pieces) consumed in all the token-operated game machines constituting the present game system is added up as the total accumulated token count data. In the present embodiment, for example, an initial value of the total accumulated token count data is 1000 pieces of tokens and a part of the number of pieces of tokens consumed by the player is cumulatively added to this initial value.

In the present embodiment, also in the above-described pusher game machine 2000, the single-unit jackpot drawing is carried out, and the accumulated token count data of the single-unit jackpot drawing is obtained by calculation only from the number of pieces of tokens consumed in that pusher game machine 2000. On the other hand, the accumulated token count data of the total jackpot drawing managed and run by the management server 4000 is obtained by calculation from the number of pieces of tokens consumed by all the token-operated game machines constituting the present game system. As a result, it is possible to increase the number of pieces of tokens to be paid out to a winner when the winner wins the jackpot drawing.

A specific process flow will be now explained. The control device 4001 of the management server 4000 receives the intra-arcade accumulated token count data transmitted from each gaming arcade server 5000 at a predetermined timing (for example, at intervals of 10 minutes) thereby, first, to perform a process for cumulatively adding to the total accumulated token count data in the storage device 4002, as shown in FIG. 14. Thereafter, the total accumulated token count data stored in the storage device 4002 at this time point is transmitted to the gaming arcade server 5000 that is a transmission source of the intra-arcade accumulated token count data that is received immediately before. The gaming arcade server 5000 that receives the total accumulated token count data transmits the same data to each of the token-operated game machines 1000, 2000, and 3000. Then, in each of the token-operated game machines 1000, 2000, and 3000 that receive that data, respective displays of the total accumulated token count are updated based on the received total accumulated token count data. In the present embodiment, the total numbers of pieces of accumulated tokens are individually displayed in each token-operated game machine. In this case, a display device for displaying the total accumulated token count may be arranged within the gaming arcade in order to omit the individual display in each token-operated game machine.

The total jackpot drawing in the present embodiment is started under the condition that the management server 4000 receives the intra-arcade accumulated token count data from the gaming arcade server 5000.

In the present embodiment, when receiving the intra-arcade accumulated token count data from each gaming arcade server 5000, the control device 4001 of the management server 4000 executes the total jackpot drawing program and carries out a gaming arcade drawing as a group drawing. In this gaming arcade drawing, a drawing is carried out to determine whether the gaming arcade of the transmission source of that data is won or lost by checking the generated random number in reference to the predetermined winning table. When the winning is determined in the gaming arcade drawing, the control device 4001 transmits winning data to the effect that the gaming arcade server 5000 is won in the gaming arcade drawing, to the gaming arcade server 5000 that has transmitted the intra-arcade accumulated token count data that is a condition for starting the drawing.

Another method therefor may include the following, for example. That is, when receiving the intra-arcade accumulated token count data from any one of the gaming arcade servers 5000, the control device 4001 of the management server 4000 executes the total jackpot drawing program so as to perform the gaming arcade drawing to determine which one of the gaming arcades win or neither one of the gaming arcades win by checking the generated random number in reference to the predetermined winning table. In this gaming arcade drawing, the winning gaming arcade may not necessarily be determined. Therefore, there is a case where neither one of the gaming arcades wins in the gaming arcade drawing. When winning of any one of the gaming arcades is determined in the gaming arcade, the control device 4001 transmits the winning data to the effect that the gaming arcade server 5000 is won in the gaming arcade drawing, to the gaming arcade server 5000 (of the gaming arcade) relating to that winning.

It is noted that the condition for starting the total jackpot drawing is not limited to the above-described condition but may include any condition as long as it may occur at suitable time intervals. For example, the total jackpot drawing may be optionally started under the condition that a predetermined constant time is elapsed.

The gaming arcade server 5000 that has received the winning data performs a process for determining, as a winner for the total jackpot award, which one of the players who plays in the token-operated game machines 1000, 2000, and 3000 connected to the gaming arcade server 5000 in the gaming arcade. In this process, it is informed that there is a winner for the total jackpot drawing within the gaming arcade. In this way, a sense of expectation (such as any player can be a winner) is grown and an interest in who has won the game is developed. In doing so, a performance used for an advance notification (hereinafter, referred to as a "total jackpot advance performance") is carried out for getting attention of, for example, the player and the audience in the whole gaming arcade. This total jackpot performance needs to be carried out simultaneously at all the token-operated game machines 1000, 2000, and 3000 in the gaming arcade, and in this case, due to a certain reason related to the game progress at each of the token-operated game machines 1000, 2000, and 3000, a timing at which the performance is carried out (total jackpot performance timing) needs to be adjusted. Because at each of the token-operated game machines 1000, 2000, and 3000, the game is individually progressed, and thus, depending on a certain progress situation, the progress of that game may be impeded by the total jackpot performance, resulting in an undesirable case where a sense of enjoyment of the player is greatly decreased.

For example, in the horse-racing game machine 1000, if the total jackpot performance is suddenly started at a time when a race is reproduced by using the field unit 1002, the excitement of the game originally provided in that horse-racing game machine is significantly decreased, hence not preferable. Further, in the pusher game machine 2000, if the total jackpot performance is suddenly started in the middle of a drawing where a large amount of tokens to be paid out can be expected such as in a physical drawing of the bingo game and the single-unit jackpot drawing, the excitement of the game originally provided in that pusher game machine is significantly decreased, hence not preferable. Moreover, in the slot machine 3000, if the total jackpot performance is suddenly started in the middle of the winning performance when a large amount of tokens to be paid out such as in the green 7 award and the red 7 award is determined, the joy of the player is significantly decreased, hence, not preferable.

On the other hand, at each of the token-operated game machines 1000, 2000, and 3000, there is a timing at which adverse effect (such as decreasing the enjoyment originally provided in that token-operated game machine) is less caused even when the individual game progress is impeded by the total jackpot performance. For example, in the horse-racing game machine 1000, at a timing used for betting a token by the player, i.e., a timing used for purchasing a betting ticket, the adverse effect is less caused. Thus, this timing is suitable for starting the total jackpot performance. Further, for example, in the pusher game machine 2000, at a timing except for a middle of a drawing where a large amount of tokens to be paid out can be expected or a middle of the winning performance therefor, the adverse effect is less caused. Thus, this timing is suitable for starting the total jackpot performance. Moreover, for example, in the slot machine 3000, at a timing from a first slot game is ended to a subsequent slot game is started, concretely, from a time after the loss is determined in the last slot game or after the winning performance is ended to a time before the start button 3006 of the subsequent slot game is operated, the adverse effect is caused less. Thus, this timing is suitable for starting the total jackpot performance.

In each of the token-operated game machines 1000, 2000, and 3000 of the present embodiment, the game progress situations illustrated here are set in advance as situations where the total jackpot performance can be carried out.

Figure 15:
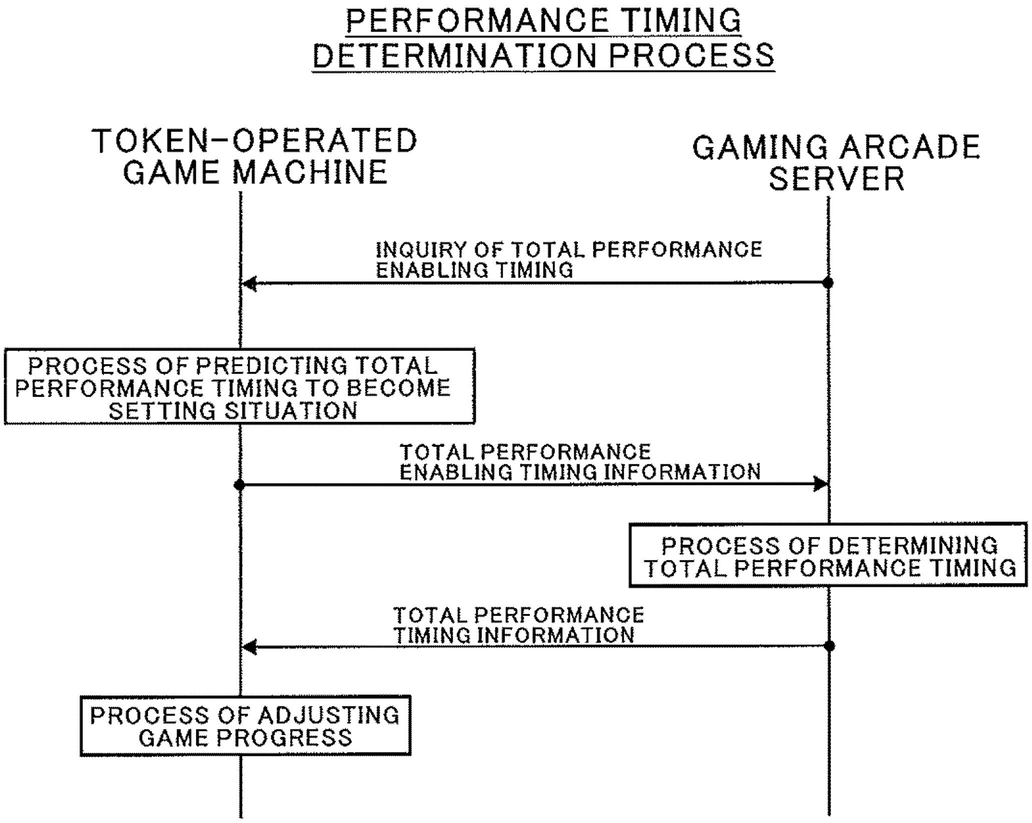
FIG. 15 is a sequence flowchart for explaining a determining process of a total jackpot performance timing.

FIG. 15 is a sequence flowchart for explaining a determining process of the total jackpot performance timing.

The gaming arcade server 5000 that has received the winning data, first, inquires all the token-operated game machines 1000, 2000, and 3000 through the LAN of a timing at which the game progress situation becomes capable of carrying out the total jackpot performance. In response to this inquiry, the control devices 1101, 2621, and 3101 of the respective token-operated game machines 1000, 2000, and 3000 function as timing anticipation processing means, by working solely or working together with the other control devices 1201, 2601, and 2611, and constituting timing anticipation processing units, and execute a timing anticipation program so as to perform a process for predicting a timing at which each game progress situation becomes the above-described setting situation previously determined. Then, the control devices 1101, 2621, and 3101 of the respective token-operated game machines 1000, 2000, and 3000 send total performance enabling timing information indicating the anticipated timing, back to the gaming arcade server 5000 from the external communication devices 1108, 2625, and 3107. The control device 5001 that is a total performance timing determining unit of the gaming arcade server 5000 functions as total performance timing determining means, and based on the total performance enabling timing information forwarded from each of the token-operated game machines 1000, 2000, and 3000, determines the total performance timing at which the total jackpot performance is carried out. Concretely, based on each total performance enabling timing information, an earliest timing at which the total performance enabling timings of all the token-operated game machines 1000, 2000, and 3000 overlap is specified, and the resultant timing is determined as a total performance timing. Then, information on the determined total performance timing is transmitted to each of the token-operated game machines 1000, 2000, and 3000. In each token-operated game machine that has received the information, at the determined total performance timing, the game progress is controlled so that the game progress situation at each token-operated game machine becomes the above-described predetermined setting situation where the total jackpot performance can be carried out. A specific method of controlling is as follows: the above-described setting situation is stored in each of the token-operated game machines 1000, 2000, and 3000, the stored information on the setting situation is read out to perform the game progress control, or the above-described setting situation is previously installed in a program for game progress control, and the game progress control is carried out according to a content of that program.

It is noted that, in order for the game progress situation to become the above-described setting situation at the exact timing of the total performance timing determined by the control device 5001 of the gaming arcade server 5000, it may need to perform a fine adjustment for the game progress in the individual token-operated game machines 1000, 2000, and 3000.

As examples of a method for the fine adjustment in the horse-racing game machine 1000, a reproducing time of a race reproduction movie is shortened or lengthened in a reproducing process of a race reproduction movie executed after each race is ended. Concretely, the reproducing time may be shortened or lengthened by setting a time for starting the reproduction of the race reproduction movie in a middle stage of the race or a final stage thereof.

Further, another method for the fine adjustment in the pusher game machine 2000 is as follows: in the slot game executed at each station unit ST, the fine adjustment is carried out by display control to lengthen or shorten a time from which the rotation of the three dice-shaped slots DS is started until it is stopped. Concretely, a speed for reproducing video from the start of the rotation of the three dice-shaped slots DS to the stop thereof may be lengthened or shortened, for example. In this case, there is no need of editing the video itself, thus, the display process is easy.

Moreover, the method for the fine adjustment in the slot machine 3000 is as follows: the fine adjustment is carried out by drive control in which a time from a start of the rotation of the three reels to a stop thereof is lengthened or shortened.

The method for the fine adjustment is not limited to those described above, and it is determined, where appropriate, depending on a game content, etc., of each of the token-operated game machines 1000, 2000, and 3000.

In particular, in a game machine in which a digital drawing is carried out, a method for lengthening or shortening a time period during which a video for drawing performance is displayed is effective as in the case of the above-described pusher game machine 2000.

It is noted that the method for determining the total performance timing is not limited to those described above.

For example, the control device 5001 that is a performance timing determining unit of the gaming arcade server 5000 is functioned as performance timing determining means. In doing so, rather than inquiring each of the token-operated game machines 1000, 2000, and 3000 of the total performance enabling timing, the total performance timing is determined according to a predetermined total performance timing determining condition. Then, the determined total performance timing is transmitted to each of the token-operated game machines 1000, 2000, and 3000, and the game progress control is carried out in each token-operated game machine so that the game progress situation at each token-operated game machine becomes the above-described predetermined setting situation in which the total jackpot performance can be carried out at the determined total performance timing. This method is effective particularly when the token-operated game machine constituting the present game system is high in the degree of freedom of the control of the game progress situation.

When the total performance timing determined by the gaming arcade server 5000 arrives, as shown in FIG. 14, the control device 5001 of the gaming arcade server 5000 performs a player presence confirming process for recognizing the players who play at each of the token-operated game machines 1000, 2000, and 3000. Concretely, all the token-operated game machines 1000, 2000, and 3000 are inquired through the LAN of whether a player is present at each game machine. In the token-operated game machines 1000, 2000, and 3000 that have been inquired, the player presence confirming process according to the respective game content is carried out.

Concretely, in the horse-racing game machine 1000, the players are each capable of playing at a plurality of stations, and thus, a process for confirming whether the player who plays the game is present is carried out at each station. An example of a method for confirming includes: it is decided that there is a player at a station at which a magnetic card is inserted into a magnetic-card inserting slot 1015.

Further, also in the pusher game machine 2000, the players are each capable of playing at a plurality of station units, and thus, the process for confirming whether the player who plays the game is present is carried out at each station unit. An example of a method for confirming this includes: it is decided that there is a player at a station unit at which there is a token on the retaining unit 2101 of the token drop-in mechanism 2100.

Moreover, since the slot machine 3000 is a game machine in which a single player plays, a process for confirming whether there is a player who plays the game at the slot machine 3000 is carried out. An example of a method for confirming this includes: it is decided that there is a player when one or more credit count data is stored in the storage device 3103.

It is noted that the method for confirming whether a player is present is not limited to those described above, and may adopt any other methods.

Each of the token-operated game machines 1000, 2000, and 3000 performs the player presence confirming process, and then, sends back presence confirming information that is the process result of that confirming process to the gaming arcade server 5000 from the external communication devices 1108, 2625, and 3107. The control device 5001 of the gaming arcade server 5000 recognizes the station or the station unit or the slot machine played by the player (hereinafter, referred to as a "station and others") which are specified based on the presence confirming information forwarded from each of the token-operated game machines 1000, 2000, and 3000. Then, the control device 5001 executes a winner determination drawing program so as to perform a winner determination drawing process for determining which drawing target is won while respectively regarding the recognized station and others as the drawing targets. Concretely, a winning table on which each drawing target is assigned an equal winning probability is generated, and a drawing target corresponding to a random number generated based on the winning table is chosen, thereby determining the winning of the chosen drawing target. In the present embodiment, in the winner determination drawing process, in addition to the total jackpot award, prepared are: a big winning with a fixed number of pieces of tokens (big bonus award), a medium winning with a fixed number of pieces of tokens (middle bonus award), and a small winning with a fixed number of pieces of tokens (small bonus award). Therefore, for these awards, the control device 5001 sequentially determines the winning drawing target by using the above-described method.

It is noted that the winning probability of each drawing target is set equally; however, it is not always the case. For example, in the gaming arcade server 5000, token consumption data is regularly received from each of the token-operated game machines 1000, 2000, and 3000, and thus, the degree of contribution contributed to an increase in the total accumulated token count data of this time per each of the token-operated game machines 1000, 2000, and 3000 (i.e., a ratio of the token consumption data received from each of the token-operated game machines 1000, 2000, and 3000 for the purpose of increasing the total accumulated token count data of this time) can be specified. For the drawing target corresponding to the token-operated game machine with a high ratio, the winning probability may be relatively increased, and for the drawing target corresponding to the token-operated game machine with a lower ratio, the winning probability may be relatively decreased.

The winner determination drawing process is ended in this way, and the station and others that have won each award are determined. Then, the control device 5001 that is a control command transmitting unit of the gaming arcade server 5000 functions as control command transmitting means, informs each of the token-operated game machines 1000, 2000, and 3000 of the winning result, and at the same time, transmits the total performance control command to each of the token-operated game machines 1000, 2000, and 3000. Thereby, the total jackpot performance that utilizes the performance unit of each of the token-operated game machines 1000, 2000, and 3000 connected to the gaming arcade server 5000 is carried out.

Next, the total jackpot performance will be explained.

Figure 16:
FIG. 16 is an explanatory view showing an example of a jackpot start screen displayed on a display unit at each of the stations, etc., which are drawing targets.

In each of the token-operated game machines 1000, 2000, and 3000 that has received the total performance control command from the gaming arcade server 5000, jackpot start screens to the effect that a total jackpot drawing is started as shown in FIG. 16 are simultaneously displayed on the display 1011, the display unit 2700, and the performance panel 3011 that are display units of the station and others relating to the drawing target. At the station and others that are not the drawing targets, i.e., the station and others at which it is decided that a player is not playing the game, this jackpot start screen is not displayed.

In the present embodiment, at the station and others that are not drawing targets, a player is capable of playing a game of the token-operated game machine even during the total jackpot performance. Thus, there is a probability that during the total jackpot performance, an individual performance according to the game progress at the station and others that are not the drawing target is carried out. However, it is probable that if an individual performance not related to the total jackpot performance is carried out during the total jackpot performance, the total jackpot performance is impeded by the individual performance, thereby decreasing a good characteristic of the total jackpot performance. Therefore, in the present embodiment, the station and others that are not the drawing targets are controlled so that the individual performance according to the game progress is not carried out or a subtle performance only is carried out by decreasing a sound volume, a light amount, etc., so that the individual performance does not stand out during the total jackpot performance.

As a result of working solely or working together with the other control devices 1201, 2601, and 2611, and constituting timing anticipation processing units, the control devices 1101, 2621, and 3101 of the respective token-operated game machines 1000, 2000, and 3000 function as performance control means for advance notification so as to carry out the total jackpot performance process by executing the total performance program. In particular, when the performance units such as the speaker and the illuminating device of each of the token-operated game machines 1000, 2000, and 3000 are caused to carry out a performance assuming part of the total jackpot performance, it becomes possible to carry out a single total performance (total jackpot performance) in which all the token-operated game machines 1000, 2000, and 3000 connected to the gaming arcade server 5000 are cooperated with each other. Concretely, for example, in all the token-operated game machines 1000, 2000, and 3000, illumination in blue and red are alternately emitted at the same timing, the same music or sound effect to the effect that a player who plays one of the token-operated game machines wins the total jackpot award is output at the same timing, and other similar effects are provided.

It is noted that, in the present embodiment, the performance unit of each of the token-operated game machines 1000, 2000, and 3000 is configured by hardware different from each another, and thus, it is not possible to carry out the completely same performance. To solve this, it may be possible to carry out the total jackpot performance that gives a sense of unity as a whole by deliberately combining the performances different from each other at each of the token-operated game machines 1000, 2000, and 3000. As an example of music and sound effect, the horse-racing game machine 1000 may take a low-sound part, the pusher game machine 2000 may take a middle-sound part, and the slot machine 3000 may take a high-sound part.

There are specific, various performance methods for the total jackpot performance that can carry out a performance that gives a sense of unity as a whole, which is achieved as a result of a mutual synchronization of the performances provided by the performance units of each of the token-operated game machines 1000, 2000, and 3000.

By starting the total jackpot performance in this way, the players and audience in the gaming arcade can know that someone of the players playing the token-operated game machines in the gaming arcade wins the total jackpot award within. Thus, the player develops a sense of expectancy to the effect that the player him/herself may win the jackpot award and waits a notification of the drawing result.

Figure 17:
FIG. 17 is an explanatory view showing an example of a slot screen displayed on a display unit at each of the stations, etc., which are drawing targets.

After the total jackpot performance is started, on each of the display units 1011, 2700, and 3011, a slot screen as shown in FIG. 17 is displayed subsequent to the jackpot start screen as shown in FIG. 16. Then, after the three reel images on the slot screen start a varying display, stop/display control is carried out on the three reel images on each of the display units 1011, 2700, and 3011 so that symbols that reflect winning or losing at the respective corresponding station and others are stopped and displayed. Concretely, in the present embodiment, as described above, there are the four awards, i.e., the total jackpot award, the big bonus award that is a payout award, the middle bonus award that is a payout award, and the small bonus award that is a payout award, and the stop/display control is carried out so that a combination of symbols corresponding to the respective awards is stopped and displayed on the slot screen. More particularly, on the display units 1011, 2700, and 3011 of the station and others that have won the total jackpot award, the stop/display control is carried out so that three identical A symbols are stopped and displayed. On the display units 1011, 2700, and 3011 of the station and others that have won the big bonus award, the stop/display control is carried out so that three identical B symbols are stopped and displayed. On the display units 1011, 2700, and 3011 of the station and others that have won the middle bonus award, the stop/display control is carried out so that a combination of symbols mixed with the A symbols and B symbols is stopped and displayed. On the display units 1011, 2700, and 3011 of the station and others that have won the small bonus award, the stop/display control is carried out so that a combination of symbols is stopped and displayed. In this case, the combination is: the A symbol or the B symbol is stopped and displayed on both a left reel image and a middle reel image, and neither the A symbol nor the B symbol is stopped and displayed on a right reel image (i.e., a blank symbol is stopped and displayed).

It is noted that there is no need that the jackpot start screen and the slot screen are completely the same in all the token-operated game machines 1000, 2000, and 3000. For example, these screens may be appropriately modified according to hardware with which these screens are displayed, or may be arranged according to the game content of each of the token-operated game machines 1000, 2000, and 3000.

Moreover, in the present embodiment, the varying display of the reel images on the slot screen is simultaneously started in all the token-operated game machines 1000, 2000, and 3000 connected to the gaming arcade server 5000; however, a completion timing at which the three reel images are stopped and displayed is differed depending on each award. Concretely, with respect to a time it takes for the stop display completion timing, it takes the least time for the station and others corresponding to the loss; it gradually takes more time in the order of the small bonus award, the middle bonus award, the big bonus award, and the total jackpot award.

Further, in the present embodiment, also while the varying display of the reel images on the slot screen is started and the stop display is completed, the total jackpot performance (performance for advance notification) is carried on. For example, after the varying display of the reel image is started on the slot screen, the performance is carried out so that the station and others illuminated with a light are sequentially switched. In this case, the illumination of the corresponding station and others (that are drawing targets of each of the token-operated game machines 1000, 2000, and 3000) are lit only in periods different from each other. Then, the drawing performance is carried out so that at the timing at which the stop display of the reel images at the station and others is completed, the illumination of the station and others is flashed.

After the total jackpot performance is ended in this way, a process for paying out tokens of which the number of pieces corresponds to that of each award is carried out for the player who plays at the station and others that have won each award. This token payout may be carried out by utilizing the token payout unit of the token-operated game machines 1000, 2000, and 3000, or may be carried out by way of an attendant pay in which the payout is made by an employee at the gaming arcade.

In the present embodiment, the total accumulated token count data indicates a value obtained by adding the number of tokens to be paid out to the player who has won the total jackpot award and the number of tokens to be paid out to the player who has won the payout award (the big bonus award, the middle bonus award, and the small bonus award). That is, when winning of the total jackpot award is determined, a predetermined number of tokens that is a part of the total accumulated token count data is paid out to the player who has won the payout award, and the remaining number of tokens is paid out to the player who has won the total jackpot award. In this case, the total accumulated token count individually displayed in each token-operated game machine may not display the number of tokens indicated by the total accumulated token count data but display only a part thereof, i.e., the number of tokens to be paid out when the total jackpot award is won.

It is noted that the total accumulated token count data indicates only the number of tokens to be paid out to the player who has won the total jackpot award, and the number of tokens for the payout award (the big bonus award, the middle bonus award, and the small bonus award) may be stored as data different from the total accumulated token count data.

Thus, according to the present embodiment, the player who plays by using each game apparatus belonging to the gaming arcade (predetermined group) selected by the management server 4000 is issued an advance notification used for notifying that the player who plays by using any one of the game apparatuses belonging to the gaming arcade has won the total jackpot award. The player who is issued the advance notification is to develop a sense of great expectation that the player him/herself may win the jackpot award, increasing a game element of the jackpot drawing.

In particular, in the game system of the present embodiment, all the token-operated game machines constituting the present system are grouped into each gaming arcade server 5000 (into each gaming arcade). Then, first, the gaming arcade drawing (group drawing) is carried out in the management server 4000 to determine whether, from all the gaming arcade servers 5000, one gaming arcade server 5000 relating to the winning is selected or the loss is established (where neither gaming arcade is selected), and then, the winner drawing is carried out in the gaming arcade server relating to the winning to determine the winner for the jackpot award. Thereby, a processing load of the management server 4000 can be alleviated, and thus, it becomes possible to process a large-scale game system at a low cost.

Alternatively, rather than carrying out the jackpot drawing by dividing it into a plurality of stages—the group drawing and the winner drawing—, the player who wins the jackpot award may be selected or the loss may be established (where neither player is selected) only through a single drawing in the management server 4000, for example. In this case also, the advance notification performance is carried out in each of the token-operated game machines 1000, 2000, and 3000 connected to the gaming arcade server 5000 at the gaming arcade where the token-operated game machine with which the winning player plays is installed.

Moreover, in the present embodiment, all the token-operated game machines constituting the present system may be grouped as one, and in this state, and the total jackpot performance (advance notification performance) may be carried out in all the token-operated game machines.

Further, rather than grouping all the token-operated game machines constituting the present system into each gaming arcade, the gaming arcade itself may be grouped into each game-machine installation area, for example. In this case, the advance notification is issued to the player who plays by using each game apparatus belonging to that group.

It is noted that, in the present embodiment, by means of the advance notification performance carried out by using the performance unit provided in each of the token-operated game machines 1000, 2000, and 3000 connected to the winning gaming arcade server 4000, the advance notification notifying that either player who plays by using these token-operated game machines 1000, 2000, and 3000 has won the total jackpot award is issued. However, the advance notification may be alternatively issued.

For example, by means of performance or information notification issued by, for example, a dedicated apparatus that is independent of these token-operated game machines 1000, 2000, and 3000, it may be possible to notify that either player who plays by using these token-operated game machines 1000, 2000, and 3000 has won the total jackpot award.

Moreover, in the present embodiment, there is a case where among the players who play by using each game apparatus belonging to the gaming arcade that has won in the gaming arcade drawing, there is a player who does not win the payout award (the big bonus award, the middle bonus award, and the small bonus award) and therefore cannot receive the token payout. In this case, it may be possible to perform a process (small-amount payout process) for paying out a predetermined amount of tokens to all the players who play by using each game apparatus belonging to the gaming arcade that has won in the gaming arcade drawing. Alternatively, in a case of further grouping the gaming arcade into each game machine installation area instead of grouping into each gaming arcade, it may be possible to perform the process (small-amount payout process) for paying out a predetermined amount of tokens to the player who plays by using each game apparatus belonging to that group.

In addition, instead of being applied to the above-described types of machines, the token-operated game machine applicable to the game system of the present embodiment can be applied to a wide use.

Further, in the present embodiment, a case where the notification processing apparatus and the jackpot drawing apparatus partially share the common apparatus (gaming arcade server 5000) is described. However, both the apparatuses may be completely different, and both the apparatuses may be one single apparatus.

Moreover, the gaming arcade server 5000 of the present embodiment is an apparatus dedicated to the present game system to which only the token-operated game machines 1000, 2000, and 3000 participating in the jackpot system are connected. However, the gaming arcade server 5000 may be a general gaming arcade server to which other game machines not participating in the jackpot system are also connected.

The invention claimed is:

1. A game system including two or more game apparatuses, each of which comprises a game progress control unit for performing game progress control, comprising:

a jackpot drawing apparatus that includes:

a drawing unit for carrying out a jackpot drawing for determining whether each of the players who plays by using one of the two or more of game apparatuses wins a jackpot award or loses so that no player wins the jackpot award;

a storage unit for storing payout amount data indicating an amount including a payout target amount to be paid out to the winning player when the drawing unit determines winning of the jackpot award;

a payout processing unit for performing a payout process for paying out to the winning player a payout target of at least a part of an amount that is indicated by the payout amount data obtained by reading out the payout amount data from the storage unit, when the drawing unit determines winning of the jackpot award; and a payout amount increasing unit for cumulatively increasing the amount indicated by the payout amount data stored in the storage unit when a predetermined payout amount increasing condition is satisfied; and a notification processing apparatus, which is connected to and capable of communicating with the jackpot drawing apparatus, for performing a jackpot award winning notification process for issuing a jackpot award winning notification issued to notify the player who wins the jackpot award determined by the drawing unit, of winning of the jackpot award, wherein before the jackpot award winning notification is issued to the player who wins the jackpot award, the notification processing apparatus performs an advance notification process for issuing an advance notification to the effect that the player who plays by using each game apparatus belonging to a predetermined group configured by two or more game apparatuses including the game apparatus with which the player who wins the jackpot award plays is notified that the player who plays by using either game apparatus belonging to the predetermined group wins the jackpot award.

2. The game system according to claim 1, comprising three or more game apparatuses, wherein the predetermined group comprises two or more game apparatuses that are a part of the three or more game apparatuses provided in the game system.

3. The game system according to claim 2, wherein the drawing unit of the jackpot drawing apparatus carries out the jackpot drawing by carrying out a group drawing for determining whether the predetermined group is selected or a loss is established in which neither group is selected from previously determined two or more groups each being configured by two or more game apparatuses, and by carrying out a winner drawing for determining the player who wins the jackpot award from the players who play by using two or more game apparatuses belonging to the predetermined group, when the predetermined group is selected by the group drawing.

4. The game system according to claim 1, wherein the payout processing unit of the jackpot drawing apparatus performs, when the drawing unit determines winning of the jackpot award, a small-amount payout process for paying out a payout target to the player who plays by using at least a part of the game apparatuses belonging to the predetermined group, the payout target having an amount smaller than a payout amount paid out when winning of the jackpot award is determined.

5. The game system according to claim 4, wherein the drawing unit of the jackpot drawing apparatus serves as a drawing unit for carrying out, in addition to the jackpot drawing, a payout award drawing for determining a player who receives, as a payout award, the payout of the payout target having a smaller amount than the payout amount paid out when the winning of the jackpot award is determined from the players who play by using the game apparatus belonging to the predetermined group, the payout processing unit of the jackpot drawing apparatus performs the small-amount payout process on the winner when the drawing unit determines the winner for the payout award, and the notification processing apparatus performs a payout award winning notifying process in which the drawing unit performs a payout award winning notification that is to notify the winner of the payout award, of the winning of the payout award, after the advance notification is issued.

6. The game system according to claim 5, wherein the notification processing apparatus performs the jackpot award winning notifying process so that the jackpot award winning notification is issued after the payout award winning notification is issued.

7. The game system according to claim 4, wherein when the drawing unit determines the winner for the jackpot award and the winner for the payout award, the payout processing unit performs a payout process for paying out a payout target having a part of an amount indicated by the payout amount data that is read out from the storage unit, to the player who wins the jackpot award, and at the same time, and performs, as the small-amount payout process, a payout process for paying out a payout target having a remaining amount of the amount indicated by the payout amount data that is read out, to the player who wins the payout award.

8. The game system according to claim 5, wherein when the drawing unit determines the winner for the jackpot award and the winner for the payout award, the payout processing unit performs a payout process for paying out a payout target having a part of an amount indicated by the payout amount data that is read out from the storage unit to the player who wins the jackpot award, and at the same time, and performs, as the small-amount payout process, a payout process for paying out a payout target having a remaining amount of the amount indicated by the payout amount data that is read out, to the player who wins the payout award.

9. The game system according to claim 6, wherein when the drawing unit determines the winner for the jackpot award and the winner for the payout award, the payout processing unit performs a payout process for paying out a payout target having a part of an amount indicated by the payout amount data that is read out from the storage unit to the player who wins the jackpot award, and at the same time, and performs, as the small-amount payout process, a payout process for paying out a payout target having a remaining amount of the amount indicated by the payout amount data that is read out, to the player who wins the payout award.

10. The game system according to any one of claims 1 to 9, wherein each game apparatus comprises a performance unit for carrying out a performance visually and audibly appealing to the player, and the game progress control unit provided in each game apparatus is for carrying out game performance control according to game progress by controlling the performance unit, the advance notification process performed by the notification processing apparatus is a process for issuing the advance notification by an advance notification performance that is carried out by using the performance unit provided in each of the two or more game apparatuses belonging to the predetermined group, the notification processing apparatus comprises a control command transmitting unit that is connected to and capable of communicating with each game apparatus and that is for transmitting a performance control command for carrying out the advance notification performance at a predetermined performance timing to the two or more game apparatuses belonging to the predetermined group, and each game apparatus comprises an advance notification performance control unit for controlling the performance unit according to the performance control command from the notification processing apparatus so as to perform advance notification performance control for carrying out a performance that serves a part of the advance notification performance at the predetermined performance timing.

11. A notification processing apparatus for issuing a winning notification of a jackpot award, connected to and capable of communicating with a jackpot drawing apparatus, the jackpot drawing apparatus comprising: a drawing unit for carrying out a jackpot drawing for determining whether each of players who plays by using one of two or more game apparatuses wins jackpot award or loses so that no player wins the jackpot award;

a storage unit for storing payout amount data indicating an amount including a payout target amount to be paid out to the winning player when the drawing unit determines the winning of the jackpot award;

a payout processing unit for performing a payout process for paying out to the winning player a payout target of at least a part of an amount that is indicated by the payout amount data obtained by reading out the payout amount data from the storage unit when the drawing unit determines the winning of the jackpot award; and a payout amount increasing unit for cumulatively increasing the amount indicated by the payout amount data stored in the storage unit when a predetermined payout amount increasing condition is satisfied, wherein the notification processing apparatus and the jackpot drawing apparatus are connected and capable of communicating with each other, the notification processing apparatus performs a jackpot award winning notification process for issuing a jackpot award winning notification issued to notify the player who wins the jackpot award determined by the drawing unit of the jackpot drawing apparatus, of winning of the jackpot award, and before the jackpot award winning notification is issued to the player who wins the jackpot award, an advance notification process for issuing an advance notification to the effect that the player who plays by using each game apparatus belonging to a predetermined group configured by two or more game apparatuses including the game apparatus with which the player who wins the jackpot award plays, is notified that the player who plays by using either game apparatus belonging to the predetermined group wins the jackpot award is carried out.

* * * * *